(12) United States Patent
Gowda et al.

(10) Patent No.: US 10,084,891 B2
(45) Date of Patent: Sep. 25, 2018

(54) METHOD TO BUILD A MODULAR DISTRIBUTED NETWORK DEVICE USING MICROSERVICES ARCHITECTURE

(71) Applicant: RtBrick Inc., Bangalore (IN)

(72) Inventors: Deepak J. Gowda, Bangalore (IN); Pravin S. Bhandarkar, Bangalore (IN); Santosh Pallagatti Kotrabasappa, Bangalore (IN); Hannes Gredler, Pillberg (AT)

(73) Assignee: RTBRICK INC., Bangalore (IN)

( * ) Notice: Subject to any disclaimer, the term of this patent is extended or adjusted under 35 U.S.C. 154(b) by 109 days.

(21) Appl. No.: 15/331,796

(22) Filed: Oct. 21, 2016

(65) Prior Publication Data

US 2017/0374180 A1    Dec. 28, 2017

Related U.S. Application Data

(60) Provisional application No. 62/353,486, filed on Jun. 22, 2016.

(51) Int. Cl.
*H04L 12/28*    (2006.01)
*H04L 29/06*    (2006.01)
*H04L 29/08*    (2006.01)

(52) U.S. Cl.
CPC .............. *H04L 69/16* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 2008/0291855 A1* | 11/2008 | Bata | .................. | H04W 52/0219 |
| | | | | 370/311 |
| 2017/0149842 A1* | 5/2017 | Mathews | .............. | H04L 65/102 |
| 2017/0339247 A1* | 11/2017 | Tiwari | .................... | H04L 67/32 |

* cited by examiner

*Primary Examiner* — Minh Trang T Nguyen
(74) *Attorney, Agent, or Firm* — DLA Piper LLP (US)

(57) ABSTRACT

Disclosed herein is a distributed, modular and highly available routing apparatus that is enabled to perform IP, MPLS VPN v4 and v6 services. The routing apparatus comprises a plurality of functional modules selected from the group consisting of a processor, a data storage module, an input/output module, a shared memory, and a network module. Each functional module is driven by a software architecture comprising a TCP/IP stack, a protocol serializer, a protocol de-serializer, an in-memory data store and one or more utility applications. The software architecture is stored partially or completely in the user space of the operating system of the routing apparatus.

17 Claims, 20 Drawing Sheets

METHOD TO BUILD A MODULAR DISTRIBUTED NETWORK DEVICE USING MICROSERVICES ARCHITECTURE

CROSS-REFERENCE TO RELATED APPLICATIONS

The application claims priority to U.S. Provisional Application No. 62/353,486, filed on Jun. 22, 2016 and entitled "METHOD TO BUILD A MODULAR DISTRIBUTED NETWORK DEVICE USING MICROSERVICES ARCHITECTURE," which is hereby incorporated by reference herein in its entirety.

RELATED FIELD

The invention disclosed herein generally relates to distributed and highly scaled network device (e.g., a router). In particular, it also relates to using software architecture that adheres to a micro-service architecture to build networking software. The invention assimilates key components into a platform that effectively delivers capabilities to end users. The primary use case for this invention is the control plane on a network device like a router, however the platform can be leveraged from a software perspective for applications like network telemetry, high performance networking in gaming and high frequency financial trading.

BACKGROUND

In current generation of network devices, the software architecture is a tightly coupled monolithic having the following functionalities:
  Input and Output Processing module
  Database/persistent store
  Algorithm/processing logic operating on data The components can be arranged in a pipeline such that a module's output (e.g., A) will be an input for others (e.g., B). In other words, B will start operating/functioning only when the Module A is done. This works perfectly in a small scale environment. But, in case of scaled scenario, this kind of pipelining may become a bottleneck for the entire system. Few of the challenges of monolithic systems are:
  1. Limited programmability/extensibility: A small change made in one part of module, requires entire system to be rebuilt and deployed.
  2. Inability to scale-out: Scaling of the system requires scaling of each individual module in effect a scale up.
  3. Lack of modularity: Tight coupling between modules enables speed of processing but limits separation and reusability.
  4. Resilience challenges: Since there is a lot of interdependency between modules, resilience of a module can depend on other modules and is non-deterministic.
  5. De-featuring: It is difficult to impossible to remove features to build a solution with a smaller set of modules than the monolith. Once a feature is developed and compiled into the monolithic base it almost can never be removed without major development effort.
  6. Plug and play: It is hard to plug and play any third party code unless there is a deep understanding of existing code have access to full code base.

What is needed in the art are methods and systems that would overcome the limitations of existing monolithic systems for network devices.

SUMMARY

In one aspect, provided herein is a software architecture for enabling a distributed and high scalable network device (e.g. router). The software architecture adheres to the micro-service architecture to build networking software. The invention assimilates varying concepts from the realm of distributed computing to build on a new set of design patterns that are the basis for a new generation of routing control plane software.

Since the capabilities described in this patent are assimilated into a platform, the building blocks can be leveraged in realm of high performance networking for varying control plane applications in the networking domain like telemetry, traffic engineering or foundation for high frequency trading.

The key building block for this architecture is a Brick Daemon (BD), a generic block analogous to a stem cell in the body. A BD provides a basic run time environment block for any application in the system. A BD can be transformed into any kind of application by defining it's personality through a JSON configuration file when it is started. A BD can be transformed into a routing protocol application or some other user defined application Some of the capabilities of such a software are based on a data store that stores state of one or more routing apparatus.

In some embodiments, the data store retains information in a binary format and the same format is used to represent the object in memory, Inter-Process Communication and a Data store. All the applications that run on this platform including the components that read state from on the wire convert information into this format.

In some embodiments, the system allows for horizontal scaling of processing via sharding based on ranges, prefixes and hash thereby allowing distribution of processing load into smaller granular units working in parallel, thereby increasing resiliency in the system.

In some embodiments, the modules in the system allow plug-n-play driven by underlying JSON configuration, this allows easy addition and removal of features in a modular fashion.

In some embodiments, the architecture also introduces a new paradigm for recovery from managed migration or re-start known as Anti-Fragile Restart (AFR). This then can become the basis to migrate a working unit from one compute processor to another allowing Live BD migration with minimum down time.

Other characteristics of this system, for example, include a recursive architecture which uses routing protocols inside the system to discover end points on other processors running the same platform. All the processing nodes assume no locality of reference thereby getting away from lock and synchronization and allowing exploitation of parallelism in processing on different CPU cores.

Scaling numbers associated with this architecture are documented and based on the initial indication, the measured performance on some parameters highlighted herein is order of magnitude better than similar known systems.

In one aspect, disclosed herein is a distributed, modular and highly available network routing apparatus that is enabled to perform IP, MPLS VPN v4 and v6 services. The network routing apparatus comprises a plurality of functional modules that is selected from the group consisting of a processor, a data storage module, an input/output module, a shared memory, and a network module. In some embodiments, the network routing apparatus is run by an operating system comprising a system space and a user space.

In some embodiments, each functional module in the plurality functions modules is driven by a micro-services based software architecture comprising one selected from the group consisting of a TCP/IP stack, a protocol serializer, a protocol de-serializer, an in-memory data store, and one or more utility applications.

In some embodiments, the software architecture is at least partially retained in the user space of the operating system of the network routing apparatus.

In some embodiments, the software architecture is completely retained in the user space of the operating system of the network routing apparatus.

In some embodiments, the in-memory data store stores one or more state of the network routing apparatus. In some embodiments, the in-memory data store stores one or more state of the software architecture and network routing apparatus.

In some embodiments, each of the one or more state comprises an in-memory representation of all data organized in semi structured data tables.

In some embodiments, the one or more utility applications generate a control plane of the network routing apparatus.

In some embodiments, information in and out of the network routing apparatus is organized into a common format accessible by each of the one or more utility applications. In some embodiments, the common format is Brick Data Store Format (BDSF).

In some embodiments, a protocol serializer serializes objects from the user space as tables that are understood by BDSF.

In some embodiments, the one or more utility applications comprise an input/output daemon (IOd), a forwarding daemon (FWDd), an application daemon (APPd), or combinations thereof. In some embodiments, the software architecture allows an Anti-Fragile Restart (AFR), which comprises an instant re-start of an APPd based on a disk snapshot of a previous incarnation of a system state thereby allowing seamless restart from the previous incarnation.

In some embodiments, sharding of the software architecture is based on i) a set of neighbors of the routing apparatus within a network to create shard per neighbor, or ii) prefixes learnt from the network. In some embodiments, the sharding is based on range, hash, or lookup based on number of processors.

In some embodiments, the software architecture comprises a JSON configuration file that allows plug-n-play of features. In some embodiments, a JSON configuration file is used to specify the function of an application in the plurality of applications.

In some embodiments, the one or more utility applications allow division and separation of information in the form of prefixes and BGP address families, thereby allowing BGP protocol in the routing control plane to scale by diving processing in smaller atomic units.

In some embodiments, a planned restart is based on a stored state of the one or more utility applications, wherein the stored state is retained by persisting all tables of each of the one or more utility applications to a non-volatile memory. In some embodiments, the stored state of the one or more utility applications can be accessed by a different processor, and wherein the different processor re-populates tables using the stored state of the one or more utility applications.

In some embodiments, an unplanned restart is based on a state of the one or more utility applications that was saved in a non-volatile memory of the network routing apparatus and sequence numbers associated with such state. In some embodiments, a state for unplanned restart is created periodically as a system backup point. In some embodiments, the system backup point is saved in a non-volatile memory of the network routing apparatus.

In some embodiments, persisted state and sequence numbers are used to perform a complete recovery. In some embodiments, the one or more utility applications allow distributed sequence block management without rolling over of sequence numbers thereby allowing restart without collision post restart.

In some embodiments, the one or more utility applications allow manipulation of object attributes without assumption on the locality of reference, thereby allowing each of one or more utility applications to create tables, add objects and subscribe for remote updates without concern for locality of the tables.

In some embodiments, the one or more utility applications allow a recursive architecture where an instance of routing protocol (e.g., IS-IS) used for discovering nodes in a network is also used for discovery of service endpoints and state synchronization.

In some embodiments, the one or more utility applications allow an Anti-Fragile Restart (AFR) along with localization assumption, thereby allowing state associated with the one or more utility applications to migrate from a first node to a second node (e.g., VMs or chassis within a router or between routers).

In another aspect, provided herein is a distributed network routing system comprising a network including a plurality of network routing apparatus distributed across the network at network access points. In some embodiments, each network routing apparatus with the system comprises a plurality of functional modules selected from the group consisting of a processor, a data storage module, an input/output module, a shared memory, and a network module.

In some embodiments, each network routing apparatus is run by an operating system comprising a system space and a user space.

In some embodiments, each functional module in the plurality functions modules is driven by a micro-services based software architecture comprising one selected from the group consisting of a TCP/IP stack, a protocol serializer, a protocol de-serializer, an in-memory data store, and one or more utility applications.

In some embodiments, the software architecture is at least partially retained in the user space of the operating system of the network routing apparatus.

In one aspect, disclosed herein is a method of providing microservices-based network services in a network comprising a plurality of interconnected network routing apparatus. Here, each network routing apparatus comprises a plurality of functional modules selected from the group consisting of a processor, a data storage module, an input/output module, a shared memory, and a network module. In some embodiments, each network routing apparatus is run by an operating system comprising a system space and a user space. In some embodiments, the network services are driven by a software architecture comprising a TCP/IP stack, a publish-subscribe bus, a protocol serializer, a protocol de-serializer, an in-memory data store and one or more utility applications. In particular, the method of providing microservices-based network services comprises the steps of: initializing each network routing apparatus, creating, via one or more forwarding utility applications in the one or more utility applications, one or more tables for forwarding information from an incoming control packet to one or more input/output utility applications in the one or more utility applications, thereby sharding the information from the incoming control packet based on one or more neighboring network routing apparatus; and creating, via each of the one or more input/output utility applications, one or more new tables for forwarding information from the incoming control packet to one or more route computation utility applications in the one or more utility applications, thereby further sharding the information from the incoming control packet.

In some embodiments, initializing each network routing apparatus comprises: reading configuration stored in JSON format from the data storage module and instantiates the one or more utility applications to re-creating run time state from tables persisted in the data storage module.

In some embodiments, the sharding and further sharding is based on a mechanism selected from the group consisting of range, prefixes learned from the network, a hash function, and lookup based on number of processors. In some embodiments, the hash function is mapped to internet protocols corresponding to one or more neighboring network routing apparatus. In some embodiments, the prefixes learned from the network are spread across different route computation utility applications via prefix sharding.

In some embodiments, the method further comprises: computing, via one or more route computation utility applications, the best route for downloading a specific prefix, thereby generating a publish-subscribe update that is processed by one or more the forwarding utility applications.

In some embodiments, the one or more forwarding utility applications install the best route and starts relaying data traffic as a router.

In some embodiments, sharding is bi directional. For example, sharding can also be applied from the input/output utility applications to download a fraction of routes to various forwarding utility applications.

In one aspect, provided herein is a computer program product comprising a computer-readable medium having computer program logic recorded thereon arranged to put into effect the method of an embodiment disclosed herein.

It would be understood by one of skill in the art that any embodiments disclosed herein can be used, without any limitation, in connection with any aspect of the invention when applicable.

BRIEF DESCRIPTION OF THE DRAWINGS

Those of skill in the art will understand that the drawings, described below, are for illustrative purposes only. The drawings are not intended to limit the scope of the present teachings in any way.

DETAILED DESCRIPTION

Figure 1:
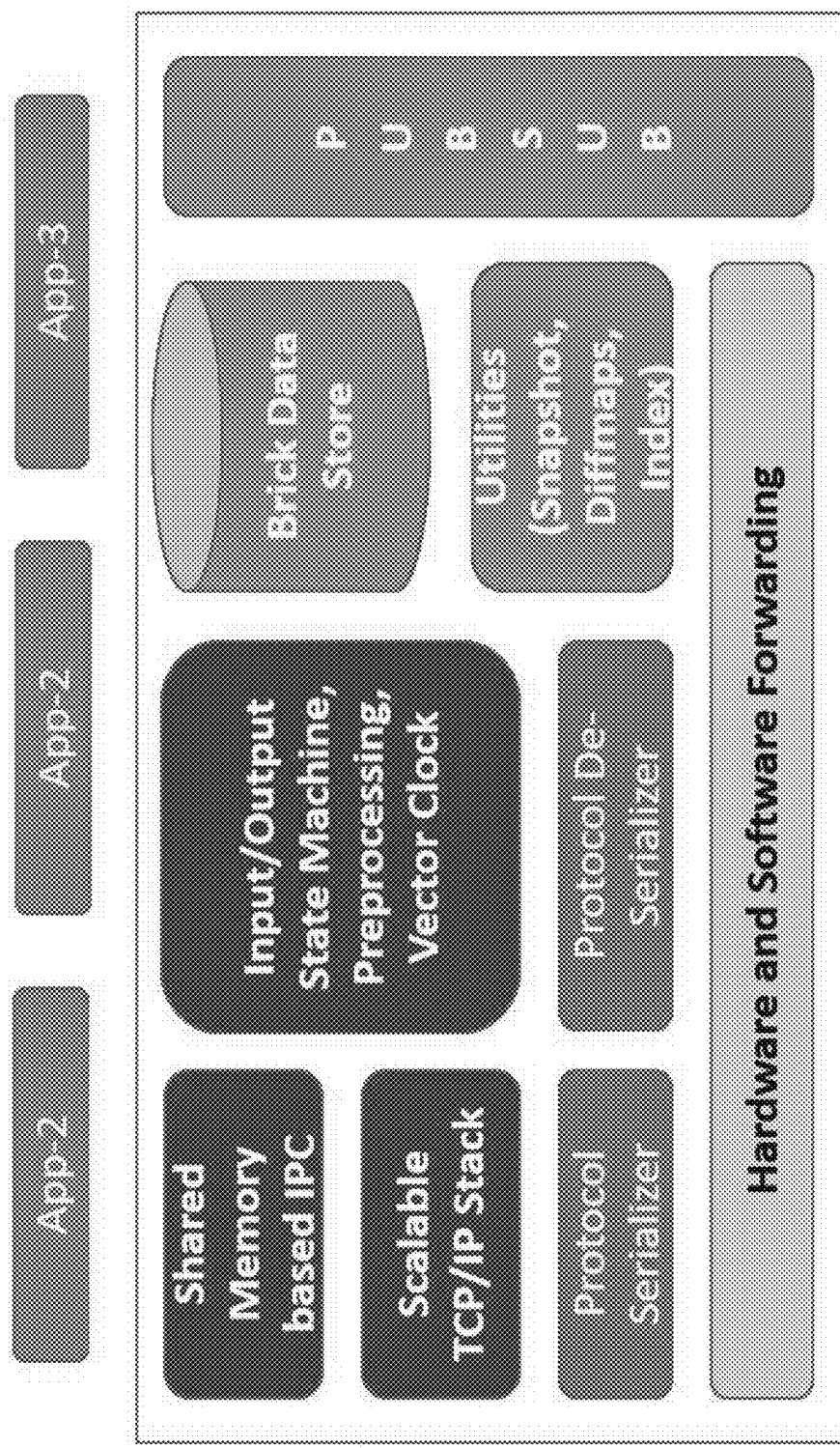
FIG. 1 depicts an exemplary embodiment, illustrating an overview of the architecture.

Unless otherwise noted, terms are to be understood according to conventional usage by those of ordinary skill in the relevant art.

The major components of the system include: Forwarding Daemon: FWDd that enables data forwarding in the platform, APPd: Any application that runs on the platform, ETCd: An application on the platform that is a registry for all the tables across APPds and IOd: Input Output daemon that performs pre-processing and session management for control plane protocols that run on the platform.

A few features have been implemented to build this platform, including, for example, identifying design patterns that enable building an abstraction called brick stem cell, which is a key building blocks for all IOds, APPds and FWDds on the platform. The building block provides an on board and off board Inter Process Communication bus and a memory format to relay messages across the system. Underlying data model on JSON, e.g., semi structured data organized in tables, is used. This is applying concepts of relational algebra/database to protocol developments by storing protocol information in tables and objects. The stem cell abstraction ensures that protocol code foot print is a fraction of the code to deliver similar capabilities in other routing architectures. Lesser code for same functionality implies lesser bugs and fewer test cases and yet broad coverage. Publish subscribe bus for inter-process communication to carry object information across the system and assume no locality of reference in information processing. This allows state generated to be used in computation without locks or synchronization across processing units. Decision to allow memory usage to expand since objects without locality of reference imply that tables are replicated multiple times. Given the falling price per unit of memory we decided to increase memory usage using it as a currency to give higher return in processing.

As disclosed herein, an architecture is applied for building a distributed network device including but not limited to an Internet scale router.

Overview of RtBrick System

The proposed software architecture adheres to the micro-service architectural style where each module is designed and developed as a single application block which runs on its own and interacts with other application blocks through well-defined interfaces and a publish-subscribe (Pub-Sub) receiver driven distribution channel. Following are some of the attributes of the resulting system.

Componentization

The back end of the system is a distributed data store, this is semi-structured data model created in memory from JSON representation. Similar format examples include the structured SQL, unstructured NoSQL and XML. Software functionality is built around with components that encapsulate the logic store for the control plane running on the platform. Each of these components implement a set of narrowly, related functions.

Programmability

The state of the system is represented by tables and objects. Maintenance of these tables and objects is taken care by the underlying software infrastructure. This enables application developer to concentrate on the application logic and corresponding algorithms. This in turn reduces the programming complexity, time to completion and number of lines of code.

Extensibility

Each component is developed and deployed independently of one another. This makes new features to be developed, tested and deployed faster. If a problem does occur, it can be isolated quickly to an individual component, making fast rollback and hot fixes easy to achieve. This enables plug and play environment.

Scale Out

Scaling is achieved through scale-out concept, where components are scaled horizontally. An important part of this solution is sharding that allows processing by dividing incoming prefixes/protocol peers across multiple instances there by enabling horizontal scaling.

System Definitions

| Terms | Context |
|---|---|
| System | Entire system like a router may consist of multiple nodes. |
| Node | System may consist of multiple nodes or may be made of single node. Node can be a one chassis in a multi chassis environment or a VM. |

The following table summarizes various exemplary architectural blocks that can be used to build a micro-services architecture, their unique characteristics and attributes.

TABLE 1

| Micro-services Architecture Components | | |
|---|---|---|
| Architecture Component | Characteristics | Attributes |
| Database of Object tables, objects and attributes | Version Control Incremental Updates Reliable Synchronization using protocols | Retaining state since startup Snapshot of state in the system A key building block for scale out and componentization |
| Brick Data Store (BDS) | Distributed replicated data store in Brick Data Store Format (BDSF) | Binary format across IPC, File system and In Memory database. Enables componentization, scale out and programmability |
| Dynamic Plugins | Capability addition using JSON configuration file definitions, Table creation and processing using underlying JSON definitions | Programmable infrastructure, Ease of extension and interactions between components and de-featuring |
| High Availability | Availability of state in binary format with consistent replication | Building block for anti-fragile restart that allows different versions of application and pre-processing code |
| Language neutral database | Allows information transformation from a specific format to BDSF | Ability to provide invocation programmable knobs to variety of high level software languages |
| BDS Format | Information transformation to RDD, HDFS, REST, NetConf | Information adaptation south bound and mediation from north bound interfaces. |
| Integration with forwarding architectures | Hardware and software forwarding paradigms | Ease of plugin and invocation |

Architecture

The system architecture is based on distributed system of small software components called Bricks. Each individual component is designed to play a small role in an overall big picture. Each of these bricks or components are implemented as a standard UNIX daemon on a contemporary Linux operating systems called Brick Daemon (BD). It will be understood that the system architecture can be implemented in other operating systems, including but not limited to, for example, Unix OS, Mac OS and etc. Unlike traditional networking devices, the information (state) is stored as objects. These objects are stored in the back stores called Brick Data Store (BDS) in Brick Data Store Format (BDSF).

Each of the daemon/components own a set of tables. They advertise this information to other components in the eco system via a Pub-Sub. The components express the interest in specific tables owned by other components, which are either onboard or off-board. Applications develop functionality implemented around the data while Pub-Sub plays the role of distributing the states (Objects) across the system via IPC's or typical UDP Packet hiding the transport from the application.

FIG. 1 provides a view of the architectural elements that enables an exemplary RtBrick system as disclosed herein. The exemplary elements in an RtBrick system include but are not limited to the following:

BDS: Brick Data Store is a unique and optimized memory representation, a template from which various objects in the system are stamped out. The infrastructure ecosystem also includes a set of utilities that allow for quick access, incremental updates and indexing of the objects. Brick Data Store is an in memory representation of the data organized in semi structured data tables. To use this concept to build networking protocol is unique.

Inter Process Communication: includes a performance sensitive shared memory IPC, scalable user space based TCP/IP stack. IPC is in memory format and persistent memory in a binary data format. This allows the consumers of the information in the system to directly interpret information.

Input Output Processing: Design pattern on which the I/O processing is built, this encapsulates routine housekeeping functions, state machine, protocol pre-processing. Here, an IOd (input/output daemon) is design. IOd is a unique abstraction that allows user to host the protocol pre-processing and protocol state machine on line cards thereby consuming network information at the point of arrival from on the wire. There are elements of pre-processing unique to RtBrick that enable high scalability. There is flexibility to host this brick where processing capability aka compute is available and yet work seamlessly with dispersed components.

Vector clock: Enables causality of events among distributed system components. It is a concept in distributed computing no innovation, think of it like an essential element needed to synchronize distributed application components.

Programmable protocol serializer/de-serializer JSON defined nested-protocol representation that can process on the wire and file based protocol formats from and to BDS objects Pub-Sub bus: Integral part of the infrastructure that enables on-board and off-board object updates. This enables loose coupling in the system which has to be complemented by easy availability of objects on which processing runs, without assuming a locality of reference Platform Independent forwarding layer: This enables both hardware and software forwarding Advantageously, distribution of processing enables high survivability in face of failure. Subsequently, fast restart allows quick re-creation of state using snap shot of objects. This substitutes fancy concepts like ISSU/NSR with a simple and deterministic solution.

Components

Some of the components that enable the above architecture are the following:

Brick Daemon

A Brick Daemon (BD) as disclosed herein is a generic building block in the system analogous to a stem cell in the body. BD provides basic runtime environment block for any application in the system. BD can be transformed into any kind of application by defining it's personality through a JSON configuration file when it is started. A BD can be transformed into a routing protocol application or some other user defined application The JSON configuration file can be changed post startup and this will entail a daemon restart to get the new personality.

Most networking applications are monoliths composed of I/O component, housekeeping functionality for liveness enablement, protocol state machinery and processing algorithms. These capabilities are mapped to, for example, a component in an RtBrick system known as IOd or an input-output daemon.

The application logic that computes best routes, and best paths through a network or any other user defined telemetry data is known as APPd or an application daemon. In a networking system, an application that enables traffic forwarding between separate instances and different systems is known as the forwarding daemon and this is built as FWDd in RtBrick system.

All three components (IOd, APPd, FWDd) need to discover each other using a service discovery daemon called ETCd. ETCd is an internal daemon that is a registry for publishers and subscribers of tables and object in the system. To some extent, an ETCd functions as an application layer registry. ETCd provides transport-IP address information and port-numbers, such that off-board components can exchange BDS state. ETCd is a center piece for bootstrapping the entire system.

Thus, a BD can manifest itself into broadly one of the three components under the following categories:

IOd (Input-output Daemon)
APPd (Application Daemon)
FWDd (Forwarding Daemon)
ETCd (Service Discovery Daemon)
Initialization Sequence ETCd helps bootstrap components on a local system start-up. Boot strapping involves table advertisements, sequence number block management and systematic handshaking between the various components to have a structured bootup. ETCd also plays a role in Anti-Fragile Restart (AFR) explained in later section.

Bootstrapping of a BD

Each BD spawned advertises the tables it owns to ETCd. This enables ETCd to have a system table view importing information from various BDs. This information is advertised back to all other BD's. Each ETCd communicates with other node's ETCd and exchange its table information. This enables each ETCd to complete view of the system.

Sequence Number Management

Figure 2:
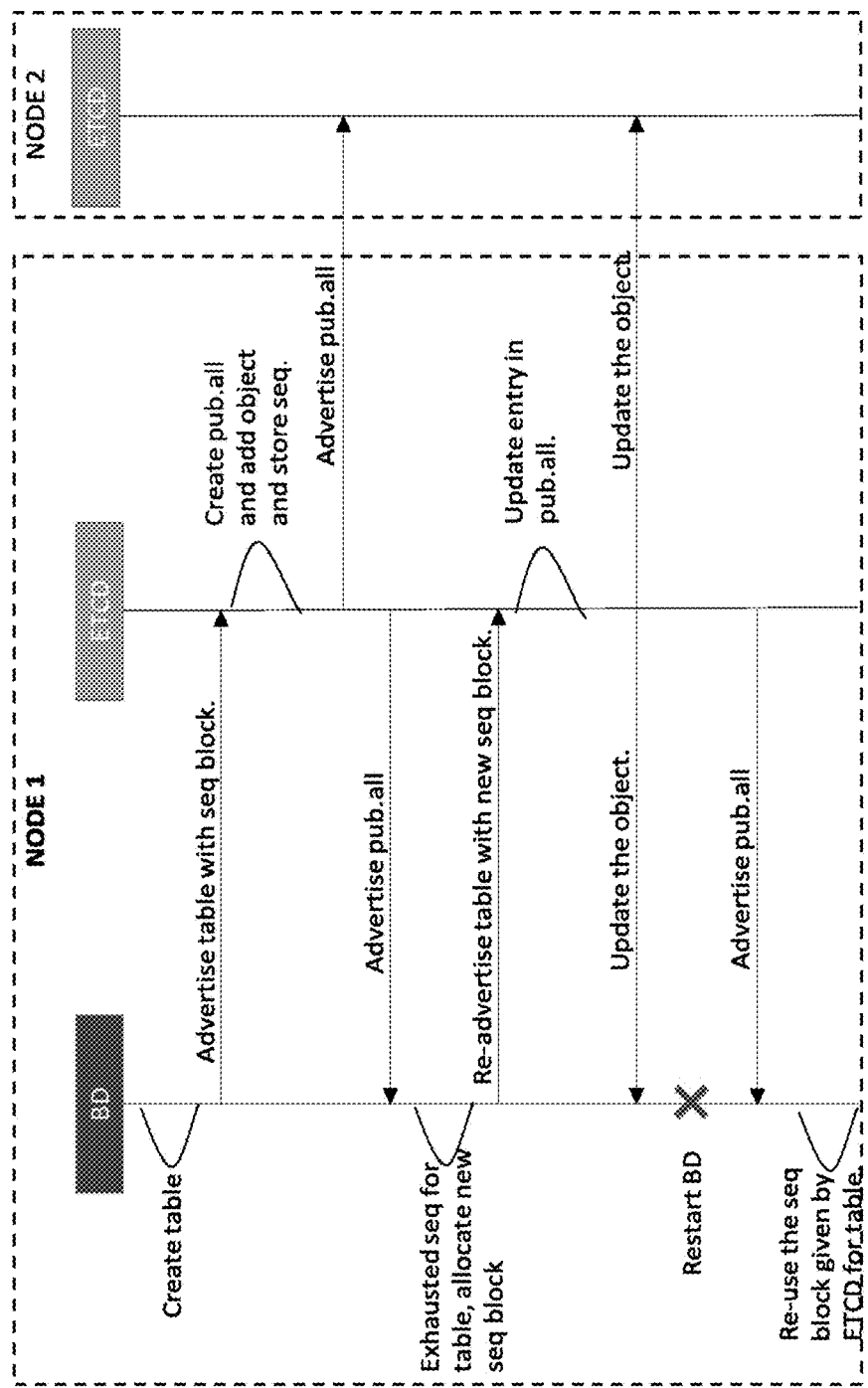
FIG. 2 depicts an exemplary embodiment, illustrating a Bootup sequence for Brick Daemon (BD).

Sequence number is a monotonically increasing number for a given table. This ensures synchronization of tables in the system. ETCd helps recover sequence number block for a table in a BD post restart. FIG. 2 includes a sequence diagram that depicts sequence number management during bootup.

Input Output Daemon (IOd)

This component is mainly designed to do input/output processing of the packets. A system might have more than a single IOd for scaling purpose. Each of these IOd subscribes to protocol specific packet tables with FWDD (which is designed for sending/Receiving of RAW packet on the wire). Essentially, IOd is a runtime programmable message parser, supporting several input and output protocol formats along with an input and output protocol caching machinery. It is responsible for:

1. Inbound protocol syntax check
2. Inbound Protocol semantic check (Buffer Overflow protection. eg: Through bookkeeping of nested TLV's)
3. Translating the inbound binary routing and signalling protocols into internal objects.
4. Translating internal BDS objects outbound into binary routing and signalling protocols.
5. Periodic keep alive absorption and generation.

Figure 3:
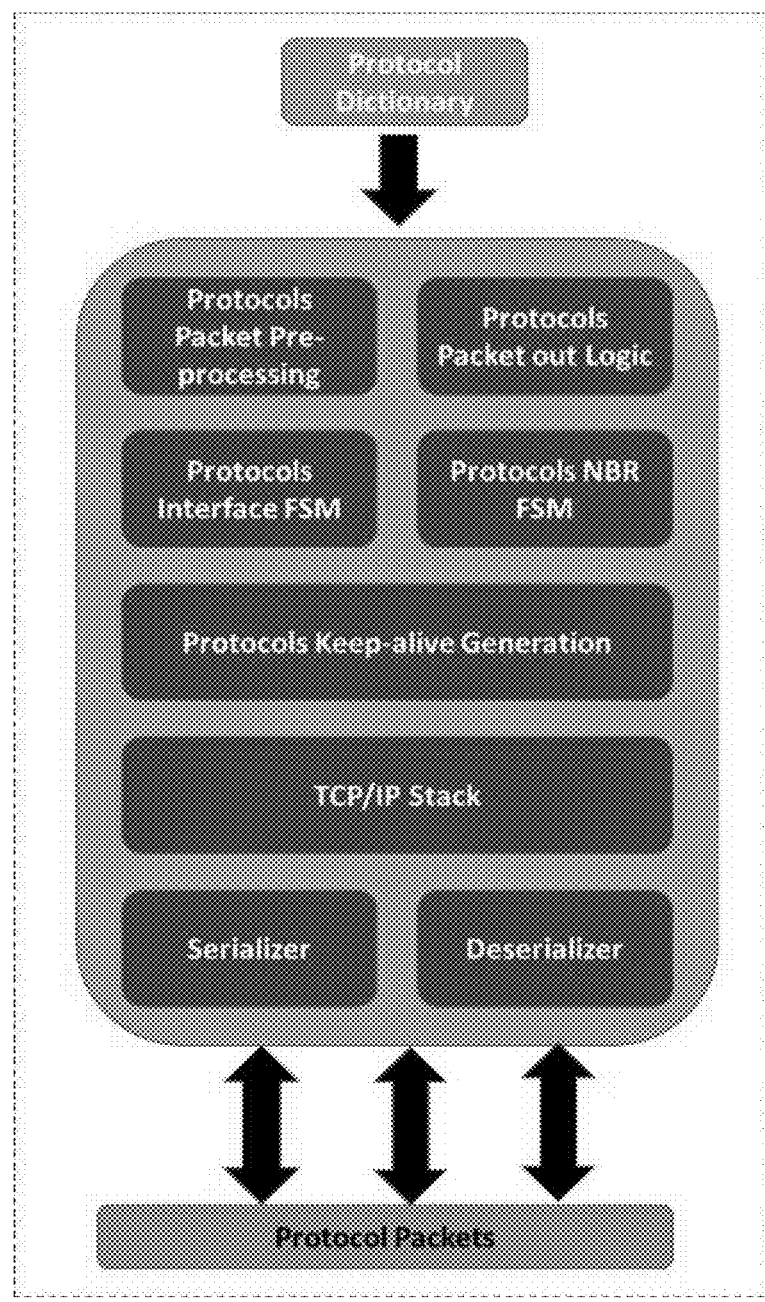
FIG. 3 depicts an exemplary embodiment, depicting various components of an IOd: Input Output Daemon.

FIG. 3 depicts the various components of an IOd. Since an IOd is designed for Packet processing, scheme driven protocol serializer/de-serializer is implemented as part of the IOd. The output of serialization is fed to a scalable user-space TCP/IP stack. User-space TCP is a necessity for message based writes, which in turn is precursory for protocol restart and Non-Stop Routing. These message processing results in building the states (Objects) of the protocol. These objects are in turn synced to set of APPd's who have subscribed for these objects via Pub-Sub.

Forwarding Daemon (FWDd)

Figure 4:
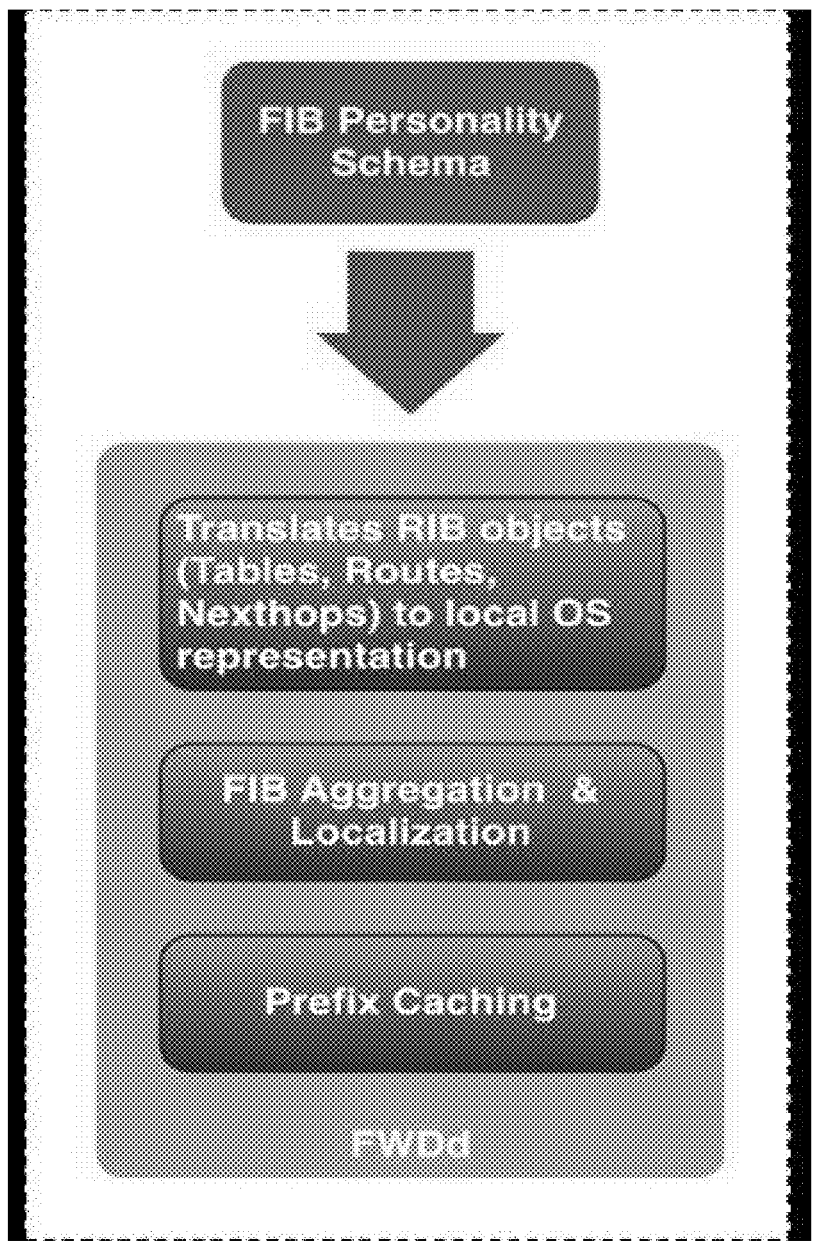
FIG. 4 depicts an exemplary embodiment of FWDd: Forwarding Daemon.

The forwarding daemon us a user-space, software based forwarder. It receives its inbound packets directly from the NIC or Chipset using direct DMA technologies like e.g. DPDK/netmap. The lookup pipeline is fully programmable, such that rapid prototypes for new data-plane functionality can be done easily. FWDd does not program its full forwarding table down to the hardware chipset. Rather it is the bottom of a forwarding cache hierarchy, which downloads only "HOT" forwarding entries. FIG. 4 shows the basic functionality and processing capabilities of FWDd.

APPds upon their route calculations download their best routes to FWDd. Each of these routes in turn are the rib-entry objects. FWDd, translates these rib-entry objects to local OS representations to tables, objects and next hop. This is the end point of objects where they are converted and sent to driver for programming. FWDd also serves as a next hop resolver for Border Gateway Protocol (BGP) APPd.

Application Daemon (APPd)

Figure 5:
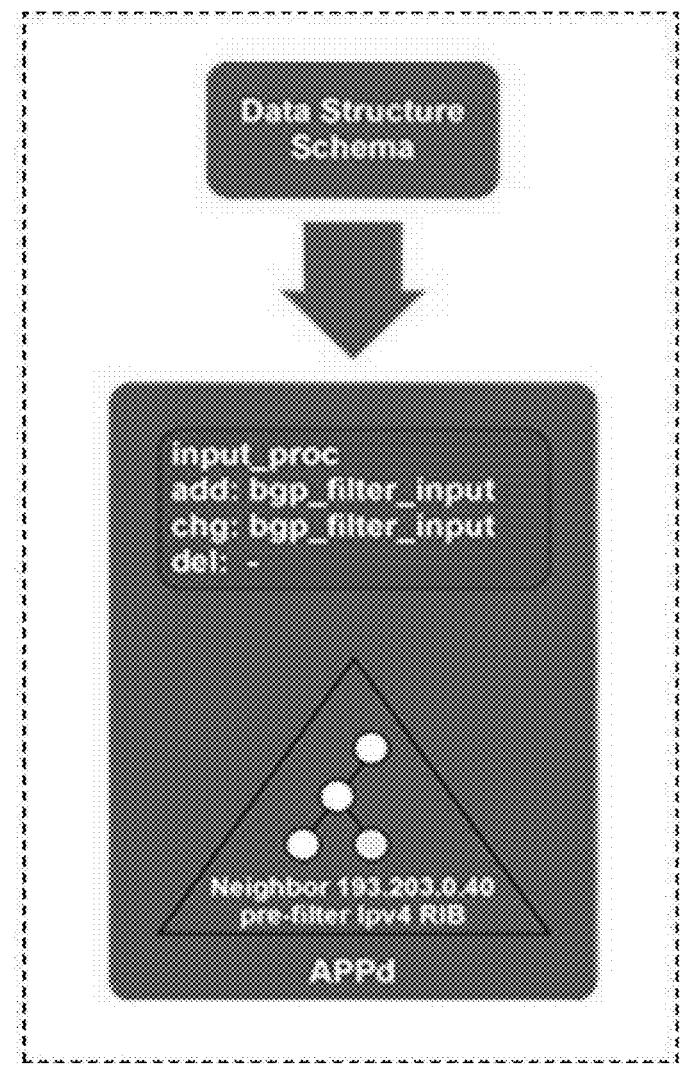
FIG. 5 depicts an exemplary embodiment of APPd: Application Daemon.

APPd is the home for protocols application logic. For example, BGP's Filtering, BGP's Best route selection, ISIS's SPF, route selection, and etc. happen in APPd. In general, APPd operate table-centric. FIG. 5 depicts a BGP daemon which is a type of an APPd in the system.

RtBrick In Action

Figure 6:
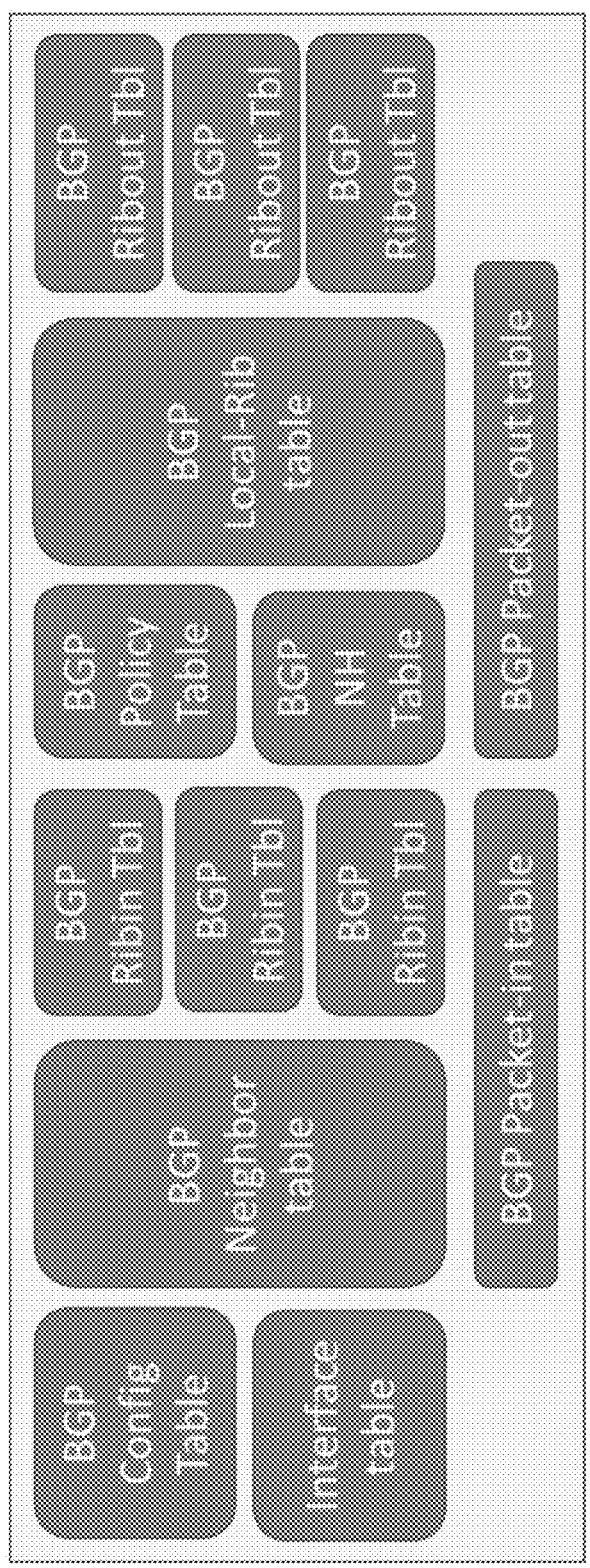
FIG. 6 depicts an exemplary embodiment, illustrating the tables needed/created by BGPd application.

In this section, we explain the end-to-end flow of data within the system in the current architecture using an example of BGP application. Assumption: BGP is enabled only for default Virtual Routing and Forwarding (VRF) instance with IPv4 Unicast address family. The design (e.g., in FIG. 6) will hold good for other Address Families as well. FIG. 6 depicts the tables needed/created by BGPd application.

TABLE 2

Exemplary tables that are needed by the BGP application:

| Table Name | Description of the Table | App Name |
|---|---|---|
| Default.bgp.instance.config | Table related to default instance configuration for BGP | CONFd |
| Default.bgp.neighbour.config | Table to store the each neighbour configuration | CONFd |
| Default.bgp.neighbour | Table to store BGP neighbour. | BGPd |
| Default.bgp.neighbour.<neighbour_ip>.ipv4.unicast.ribin | Table to store routes received from a specific neighbour | BGPD |
| Default.bgp.neighbour.<neighbour_ip>.ribout | Table to store routes sent/to be sent/for a specific neighbour | BGPD |
| Default.bgp.neighbour.<neighbour_ip>.packet.in | Table to store BGP packets received from a specific neighbour | FWDd |
| Default.bgp.neighbour.<neighbour_ip>.Packet.out | Table to store packets to be sent/for a specific neighbour | BGPD |
| Default.bgp.neighbour.<neighbour_ip>.filtered | Table to store filtered rib in routes for a specific neighbour | BGPd |
| Default.policy.<policy_name> | Table to store the policy updates | CONFd |
| Default.bgp.ipv4.unicast.local-rib | Table to store the BGP local rib for a particular AFI/SAFI pair | BGPd |
| Default.bgp.ipv4.unicast.nexthop.ipv4.unicast | Table to store the Nexthop resolution status on each nexthop | BGPd |
| Default.interface.ifl | Table to store the IFL's configured in the system | FWDd |
| Default.rib-local.ipv4.unicast | Table to store the rib entries | FWDd |

We can clearly distinguish entire functionality of BGPd into three major portions:

1. Input/output packet traversal and dispatch
2. Processing/Validating of input/output (syntax and semantic checks)
3. Route Calculation, Best path section (a.k.a. core functionality)

Figure 7:
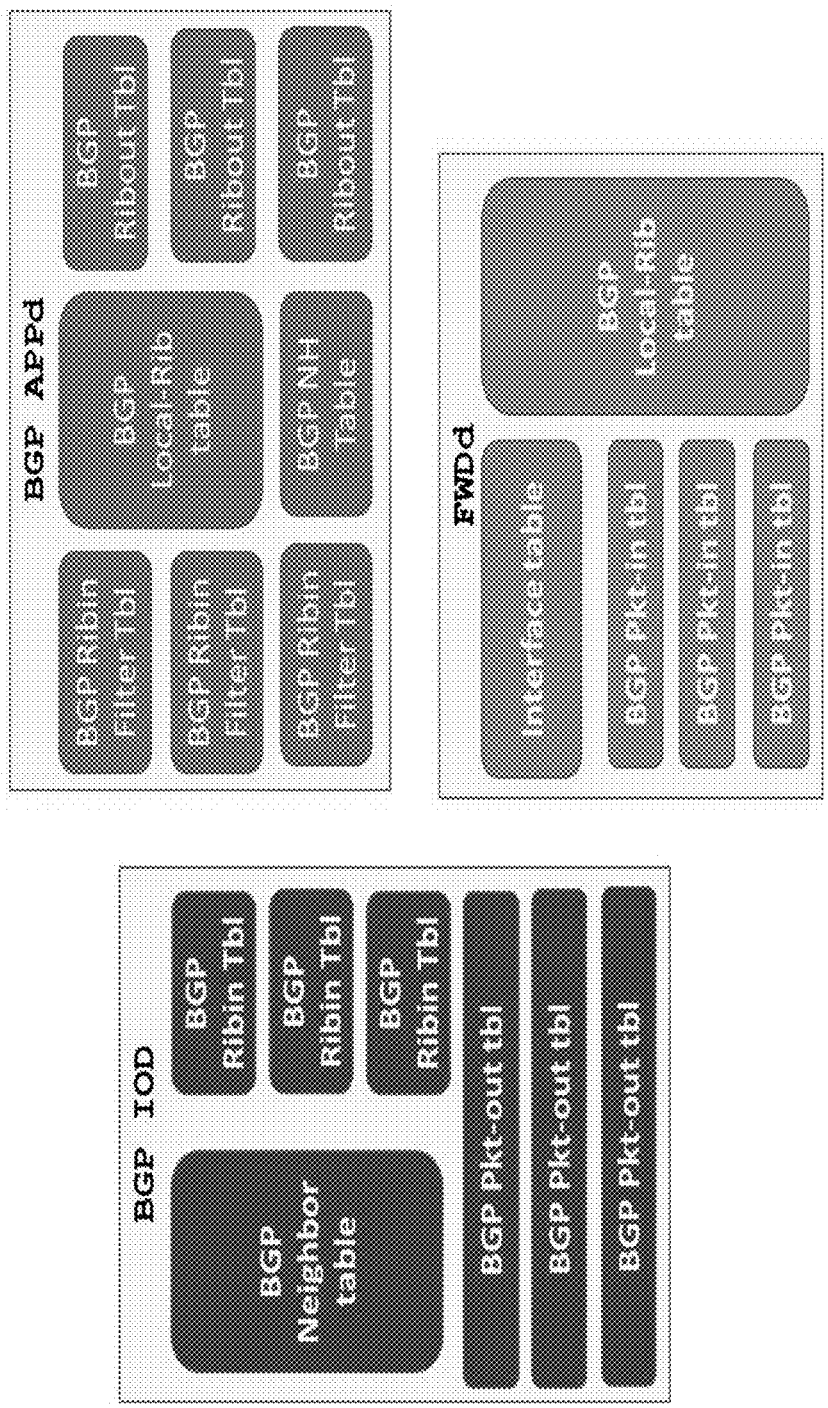
FIG. 7 depicts an exemplary embodiment, illustrating a micro service architecture layout for BGP.

Applying the micro-service design as shown in FIG. 7, we can create

BD of FWDd flavour that handles input/output packet traversal and dispatch

BGP IOd which is an IOd for processing/validating of input/output

BGP APPd to enable include processing core functionality. Depending on their role, each of the BD's create tables and subscribe for specific tables It should be noted that there is no rule on how to divide an application in this micro service architecture. All these can be combined in one single process or multiple process.

Bootup Sequence

Figure 8:
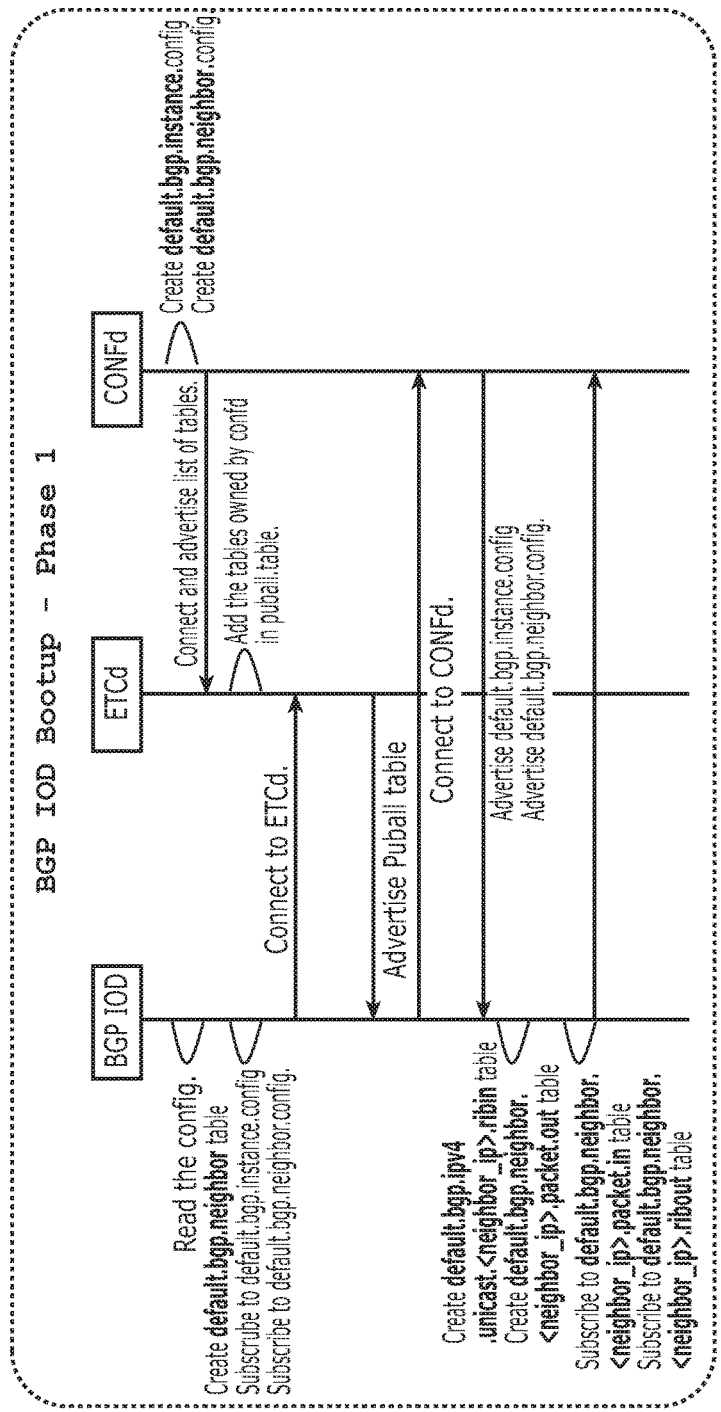
FIG. 8 depicts an exemplary embodiment, illustrating a BGP IOd Boot up Sequence.
Figure 9:
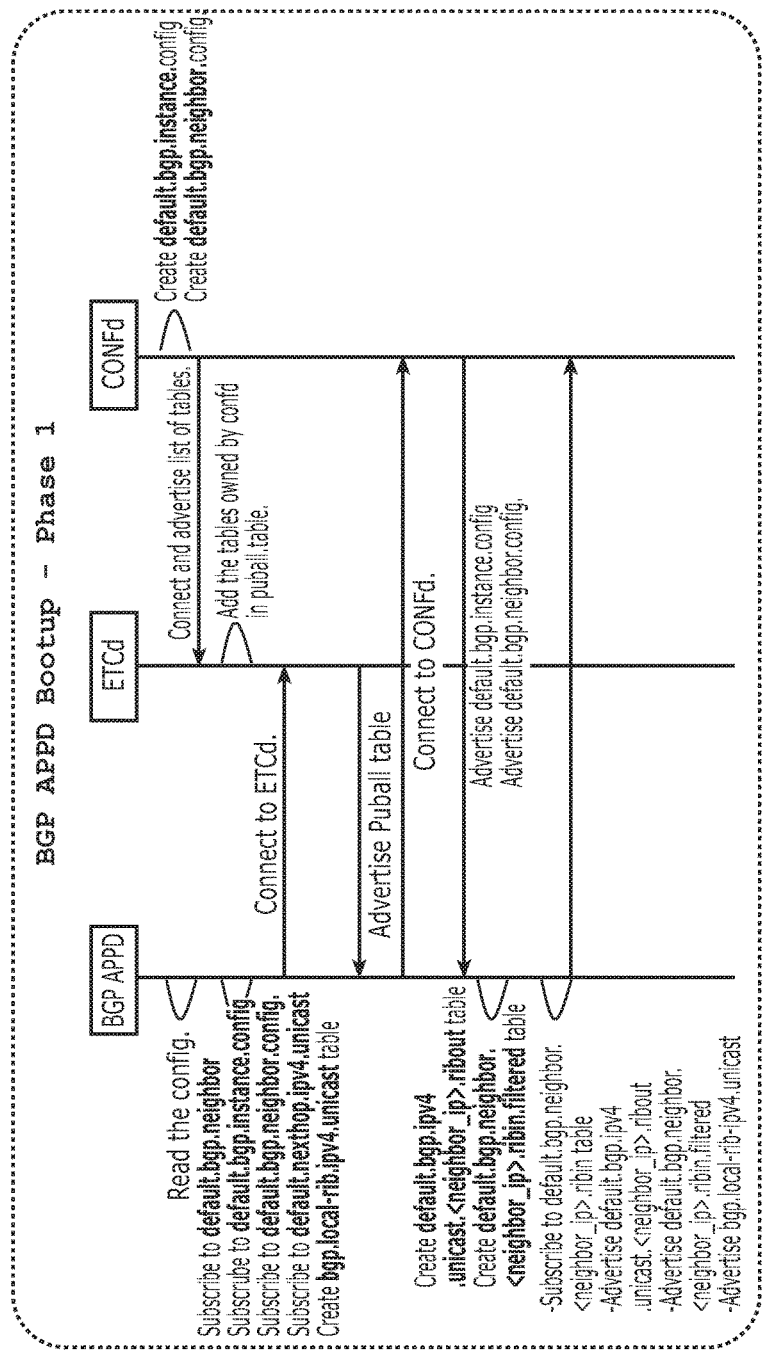
FIG. 9 depicts an exemplary embodiment, illustrating a BGP APPd Boot up Sequence.
Figure 10:
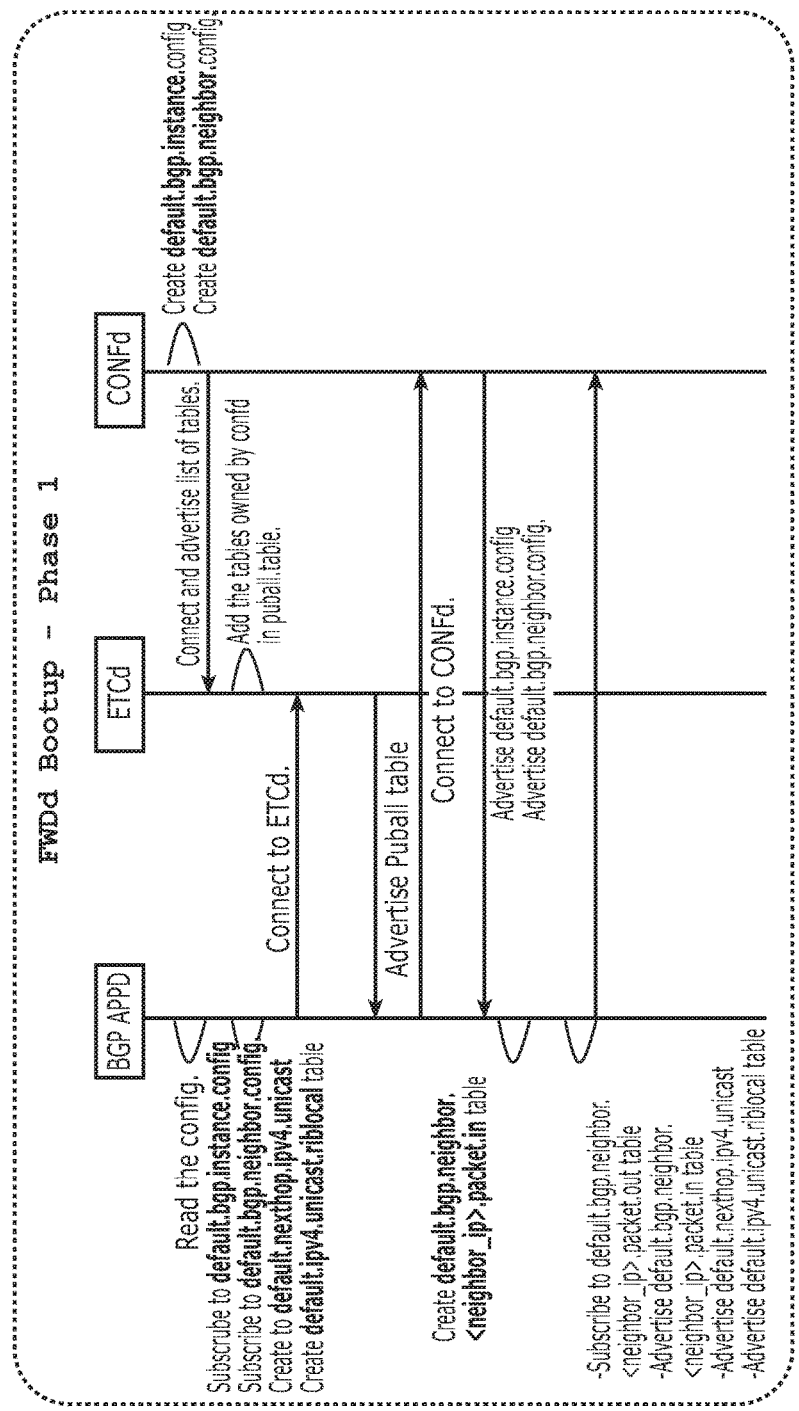
FIG. 10 depicts an exemplary embodiment, illustrating an FWDd Boot up Sequence.

The boot-up sequence is divided in to 2 phases. In the first phase as shown in the sequence diagram in FIG. 8, FIG. 9 and FIG. 10, each of the BD's create their default tables and try to connect to ETCd. After connection is established, BD advertise the table names which they own. In reply, ETCd shares the pub.all table. Each of the BD will get an initial view of tables owned by other BD's and if required, they start establishing the IPC channel with each of the BD's.

Micro-Services System Benefits

Application Modularity and Scale Out

In a large monolithic architecture (a whole) all components have to be uniformly scaled up. A small part of overall system is constrained in performance, but if that behavior is locked up in a giant monolithic application, all elements of scaling everything. This implies we have to provide more computing resources to scale up.

In micro service architecture, application's module is divided into granular components (a.k.a. BD). BD's acting as sum of parts interact to provide overall functionality. These discrete elements can be independently scaled thereby allowing BDs to execute on different hardware. More instances of the BD can be spawned so that work load can be evenly distributed across these BD's, in effect a scale out.

The above concept is explained taking BGP as an example. A single BGP BD can be run to achieve the functionality (Which is same as monolithic). But for better scaling and performance, we can:
  i. Run individual BD for each of the BGP VRF's, or
  ii. Run individual BD for each of the AFI's for a given BGP VRF's, or
  iii. Run individual BD for each of the AFI/SAFI for a given BGP VRF's It should be noted that there is no restriction on how BGP is modularized. It can be based on the running environment.

Figure 11:
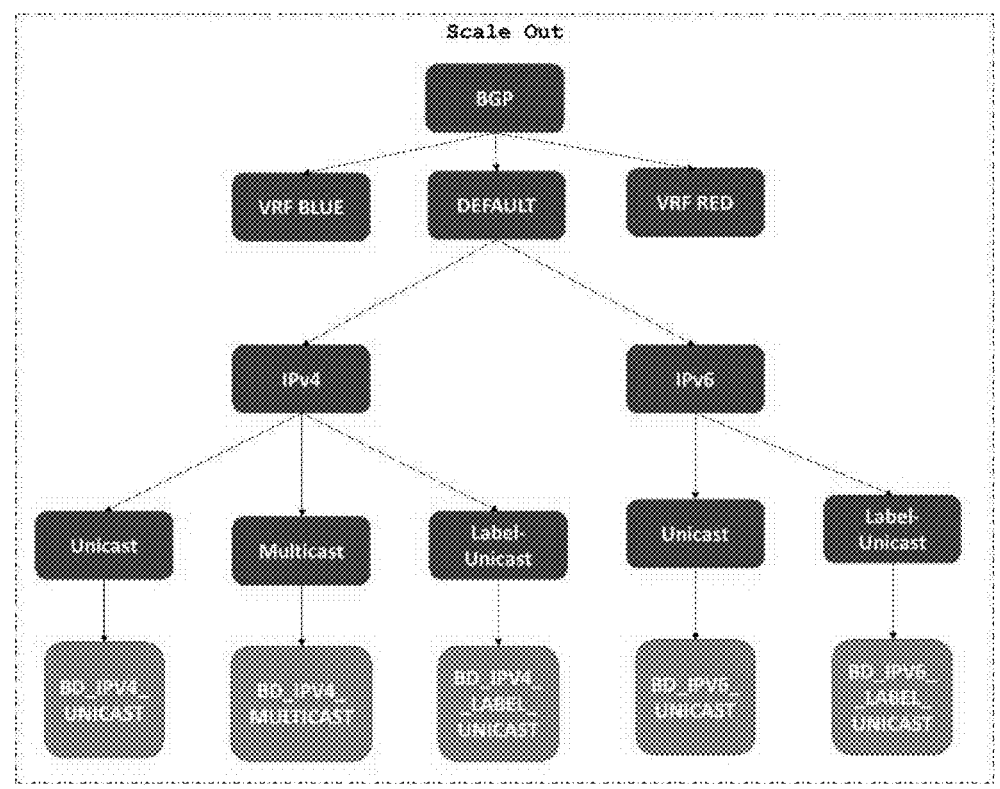
FIG. 11 depicts an exemplary embodiment, illustrating a micro service design for BGP.

FIG. 11 depicts one such organization of BGP scale out from a protocol perspective. Here a BD is serving a specific AFI/SAFI for a given VRF. If a BD restarts, say BD_IPV4_UNICAST it will impact BGP IPv4 Unicast routes. So the routes learnt on the other address vrf's/address families will remain intact.

Sharding

Figure 12:
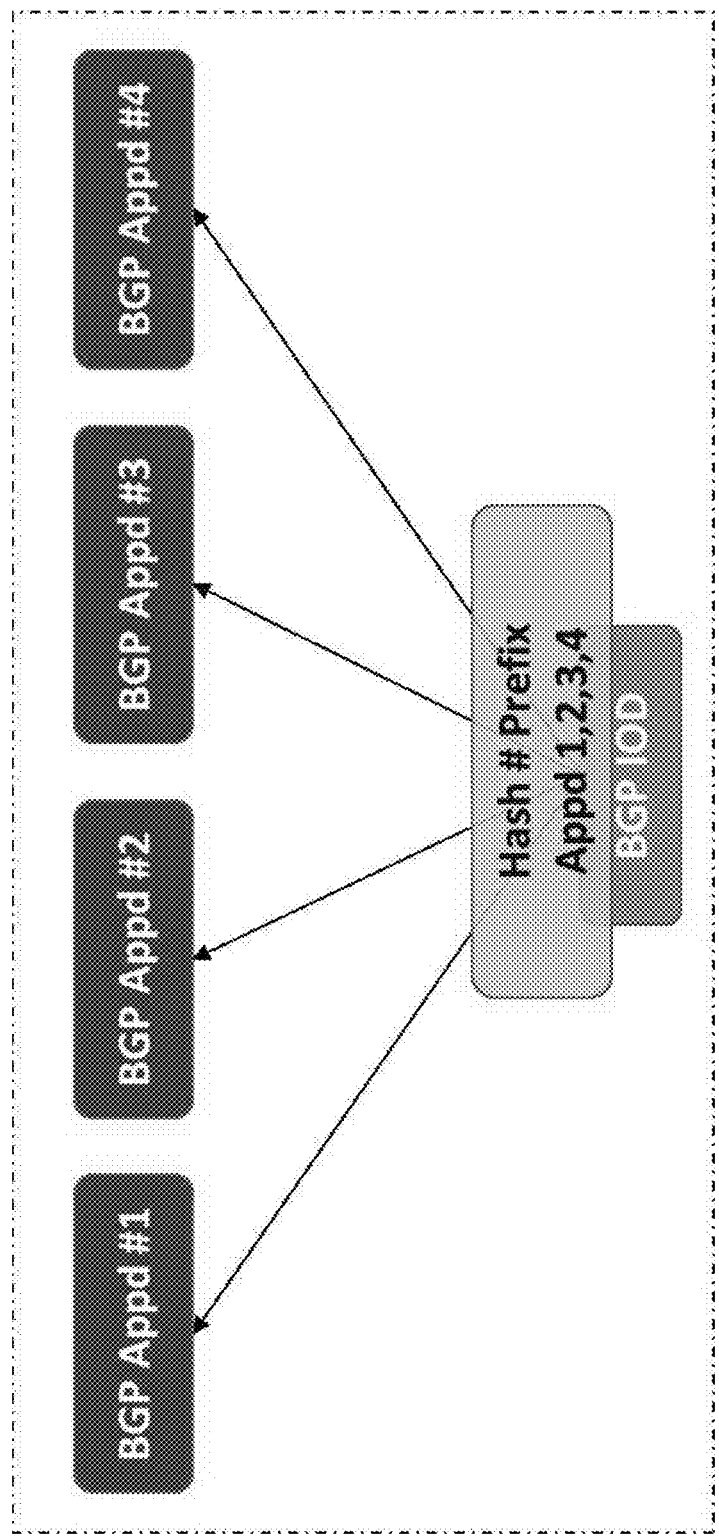
FIG. 12 depicts an exemplary embodiment, illustrating Sharding from BGP IOd to BGP Appd.
Figure 13:
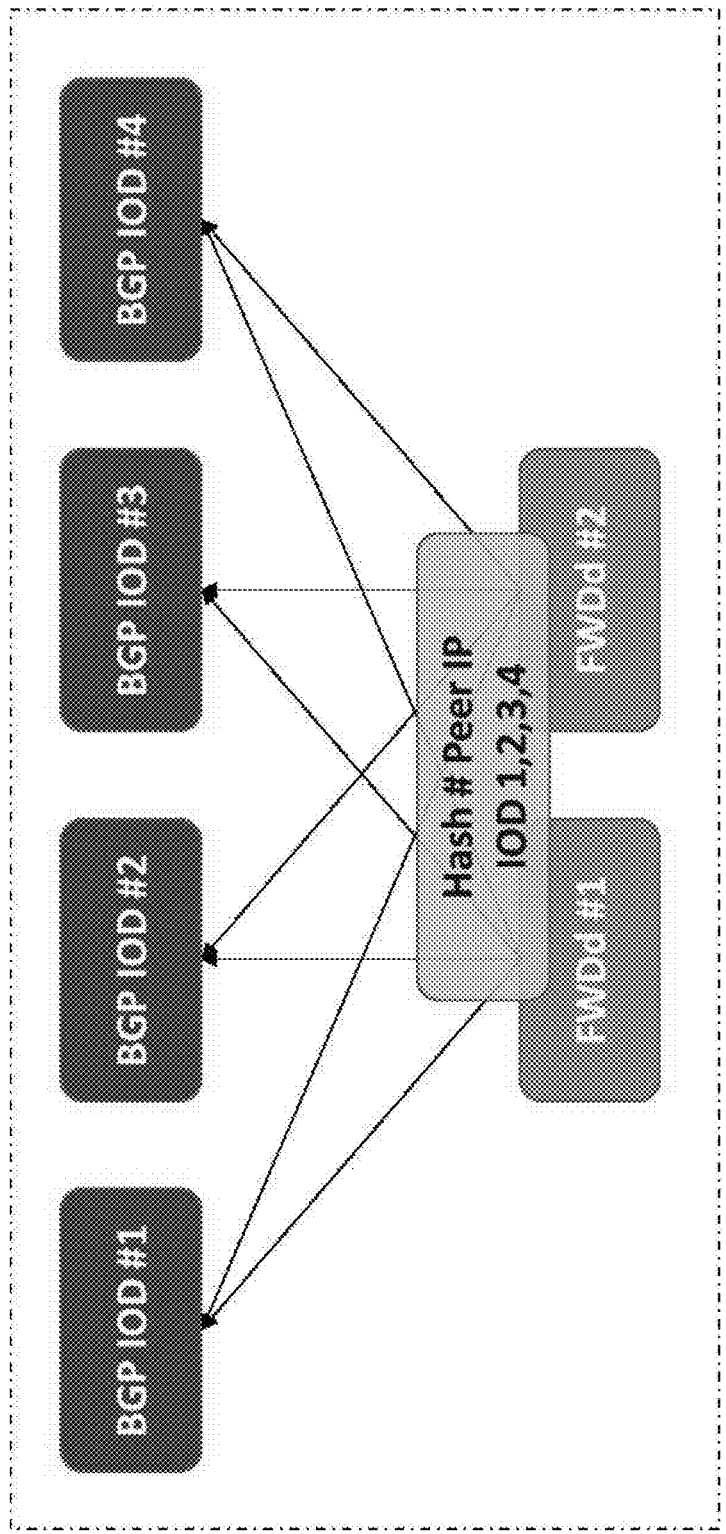
FIG. 13 depicts an exemplary embodiment, illustrating Sharding from FWDd to BGP IOd.

Scale out does not stop just at BGP address family level. It can be at a granularity of a prefix level also. In the sense, a large number of BD's can be spawned just to service range of object's key space. FIG. 12 and FIG. 13 depict a use case of horizontal scaling and sharding of prefixes that enables capabilities like scale and AF-Restart to be enabled in the system. Sharding can be on basis of number of BDs, hash key or prefix ranges.

Each of these BD's are logically separated based on the object's key space which is prefix. For e.g., if there are 4 different BD's spawned to service the IPv4/Unicast address family, then each of the BD's will be serving for prefixes in the range of [1.0.0.0-55.0.0.0], [56.0.0.0-110.0.0.0]-[111.0.0.0-165.0.0.0] & [166.0.0.0-220.0.0.0]. The range defined can be derived from user defined has function.

FIG. 12 depicts four BGP application, showing sharding from BGP IOd to BGP Appd. Each of the APPd's request for their percentage of their share (as per the illustration 25%) of a given objects key space. After processing of the BGP Update packet, IOd apply hashing on the prefix and determines to which APPd the prefix update to be sent. Thus the prefix is spread across different APPd processing buckets via prefix sharding.

Sharding is not restricted just to prefix but rather to any object attribute. FIG. 12 and FIG. 13 can be combined to create 3 levels of hierarchy starting with the forwarding plane at the lowest level. FWDd is a basic building block of forwarding and shards the incoming peer updates into 1 or more IOds based on configuration. The IOds are units that handle normal protocol housekeeping, keep-alive processing and BGP finite state machine in the router. The IOds further use a consistent hashing algorithm to shard prefixes into various buckets based on one or more APPds enabled.

This structure enables the following:
  Horizontal scaling: Adding APPds to process prefixes sharded by IOd. In the layout in case of an App failure only ¼th of the total number of prefix processing is impacted however owing to the presence of IOds handing the session there are no flaps. Additional AF-Restart allows instant re-start of the APPds based on a disk snapshot of previous0-incarnation system state to re-start processing
  AF-Restart built owing to peer update sharding that allows FWDds to send all peer updates to both IoDs (upto N*IoDs) in the system thereby allowing redundancy at the level of peer updates.

Coupling both of them there is capability to perform both sharing for load sharing, horizontal scaling and redundancy by building small replaceable units of APPds.

There are several sharding modes available, including, for example, i) Split, and ii) Split and replicate.

Split

Figure 14:
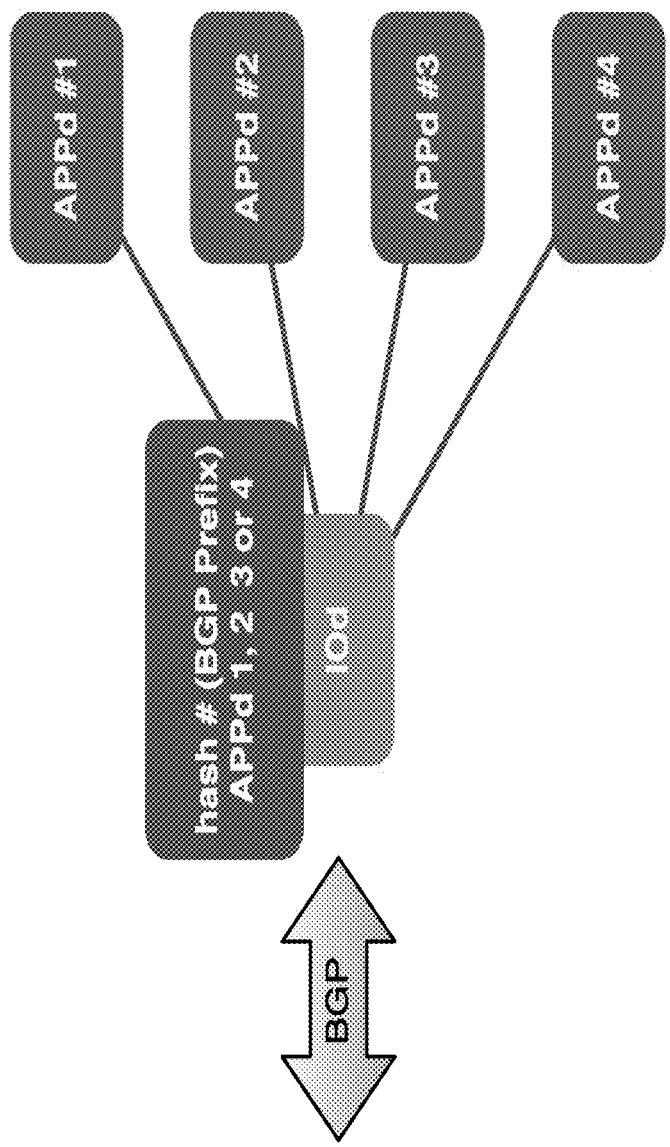
FIG. 14 depicts an exemplary embodiment, illustrating the split mode of sharding.
Figure 15:
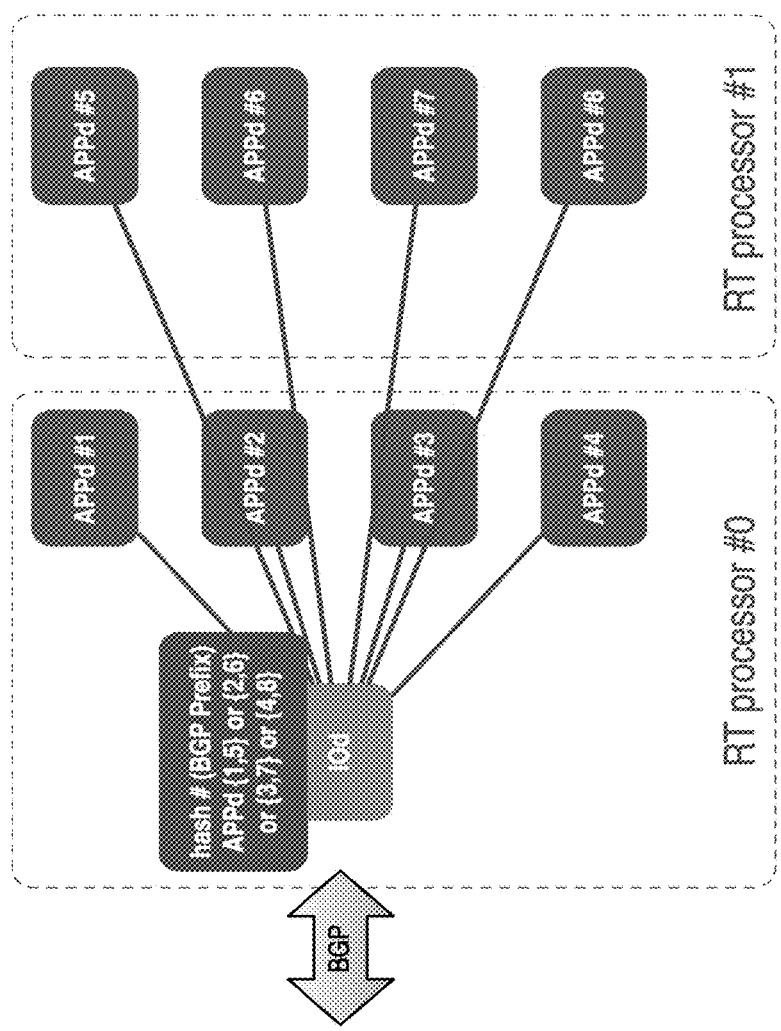
FIG. 15 depicts an exemplary embodiment, illustrating the split and replicate mode of sharding.

This mode is enables when sharding is done based on a hash key based on the number of processing units defined by the user. FIG. 14 depicts the simplest case of sharding based on a BGP prefix to APPs.

Split and Replicate Mode

This mode is enabled where sharding done over set of local BD's and a copy is replicated on the standby nodes. Enabling this mode makes the application to support NSR.

Localization Assumption

Each BD depending on their role, create their own tables and add data to those tables as objects. They subscribe to specific set of tables to get their functionality. These set of tables will be owned by other BD's in the system. These BD's might be located in same node or altogether in different node. This information is totally abstracted from BD and it is handled by underlay infra (Pub-Sub). BD's will act on a table content; it does not make any assumption on how it gets it. Underlay infra will be responsible to get the data required for a given BD.

Anti-Fragile Restart

A BD might reboot can occur owing to multiple causes ranging from a software bug or any kind of failure. Resilience is an attribute of a system that enables it to deal with the failure in a way that doesn't cause the entire system to fail. A complex system like the proposed architecture can be constantly undergoing varying degrees of failure. Resilience is how it can recover or be insulated from failure. Restart can be either planned or unplanned restart and the ability to instantly recover from partial failures is called AFR.

Table 3 below shows a key building block for AFR. The uniform memory format a.k.a. BDSF allows information interchange across file system, IPC and In Memory Database.

TABLE 3

Information interchange in the system

| | File | Inter Process Communication | In-Memory Database |
|---|---|---|---|
| File | X | X | Periodic Snapshot Pre-ISSU |
| Inter Process Communication | X | X | Serializer/De-serializer less IPC |
| In-Memory Database | AF-Restart | Serializer/De-serializer less IPC | X |

Commonality of BDSF allows periodic snapshot of information prior to In-Service-Software Upgrade (ISSU) from In-Memory Database to file system. This permits constant back up of state information from the database to file.

Interactions between IPC and In-Memory data base leading to information interchange are benefited to a large extent by not requiring the expensive serialization and de-serialization of information rather using binary format and embedded information to access various attributes of data/information in the object.

A key capability that can be availed on account of this is the Anti-Fragile re-start which allows in-memory data base to be instantly re-created from the file system and state replayed to re-start the application within matter of milliseconds.

Decentralizing responsibility for data across micro services requires strong information sharing and no assumption on locality of reference while having loosely coupled interactions. Another key aspect of the de-coupling is that the software parts can perform as individual redundant units that can be re-started instantly by replaying the state in binary format in which it is retained.

Unplanned Restart

BD crashes and reboots. Table 4 below depicts an exemplary sequence of unexpected BD reboot steps.

| Step | Description | Module |
|---|---|---|
| 1 | Read the config json file. Start creating the tables which the App owns. | Application Code |
| 2 | Add an object entry in pub.table for each of the tables it owns. The object includes sequence number block as one of the attributes. | Application Code |
| 3 | Subscribe to various tables which BD is interested in | Application Code |
| 4 | Connect to ETCd and advertise it pub table. | Pub-Sub |
| 5 | ETCd advertises the PUB all table. | |
| 6 | Loop through all the tables which it owns and check whether the sequence number block is in SYNC. If the Sequence number block is greater than or equal to current block number which it owns, BD moves to next sequence number block for that table and advertises this block back to ETCd. | Pub-Sub |
| 7 | Loop through each of the subscribed objects and start establishing the IPC connection with Those BD's which are owning the specific objects/tables | Pub-Sub |
| 8 | Sends an initial sequence number in the CSNP to all the subscribed tables which results in BD's to dump their entire table. | Pub-Sub |

Figure 16:
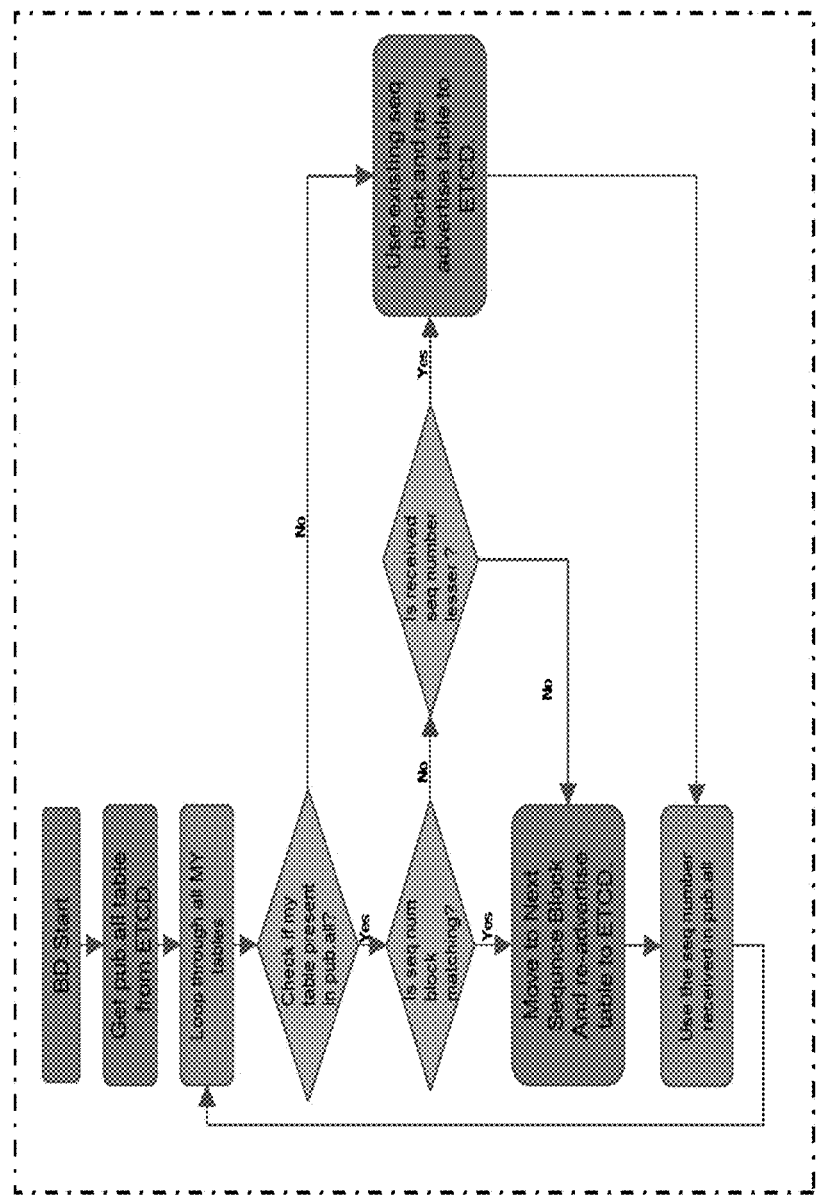
FIG. 16 depicts an exemplary embodiment, illustrating sequence number management with regard to BD.
Figure 17:
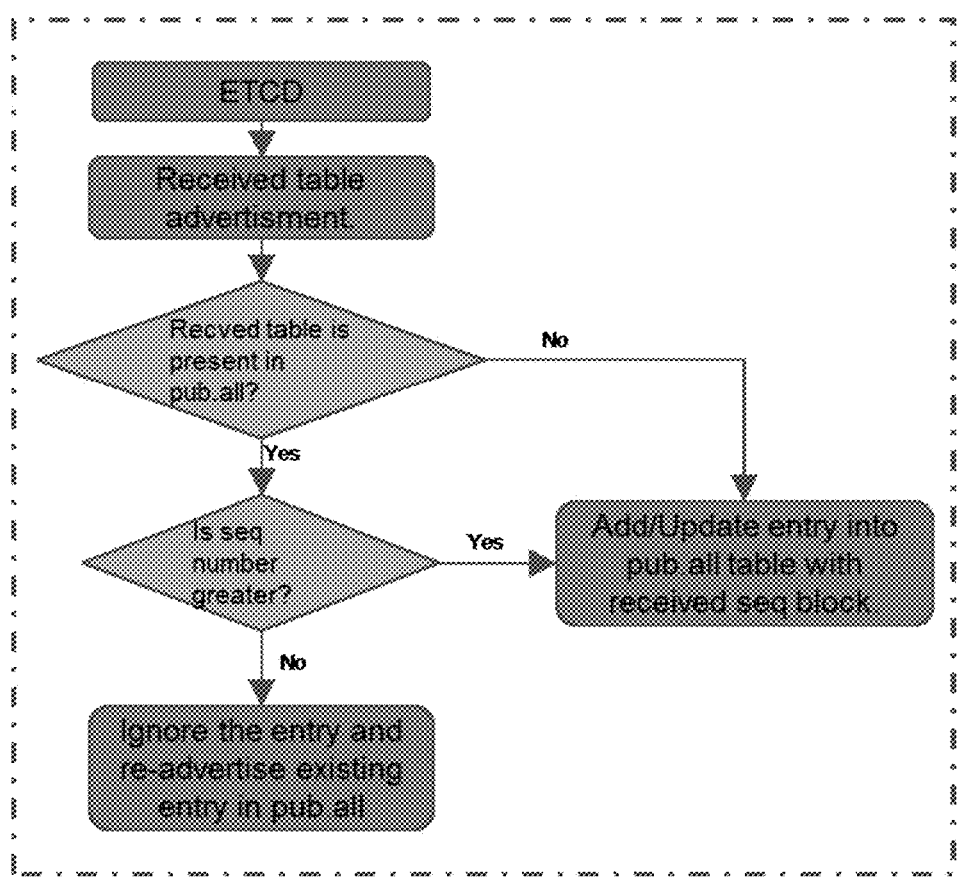
FIG. 17 depicts an exemplary embodiment, illustrating Sequence number management with regard to ETCd.

FIG. 16 depicts the Sequence number management happening at restarted BD while FIG. 17 depicts the sequence number management at ETCd.

Planned Restart

In case of a planned restart (e.g., it can be for ISSU upgrade, maintenance, etc.), we can take a complete view of the BD by dumping all its tables to a non-volatile memory. This is called taking a snapshot. We can again spawn the new BD reading back the dumped file, which will resume where it was at the time of the dumping.

Figure 18:
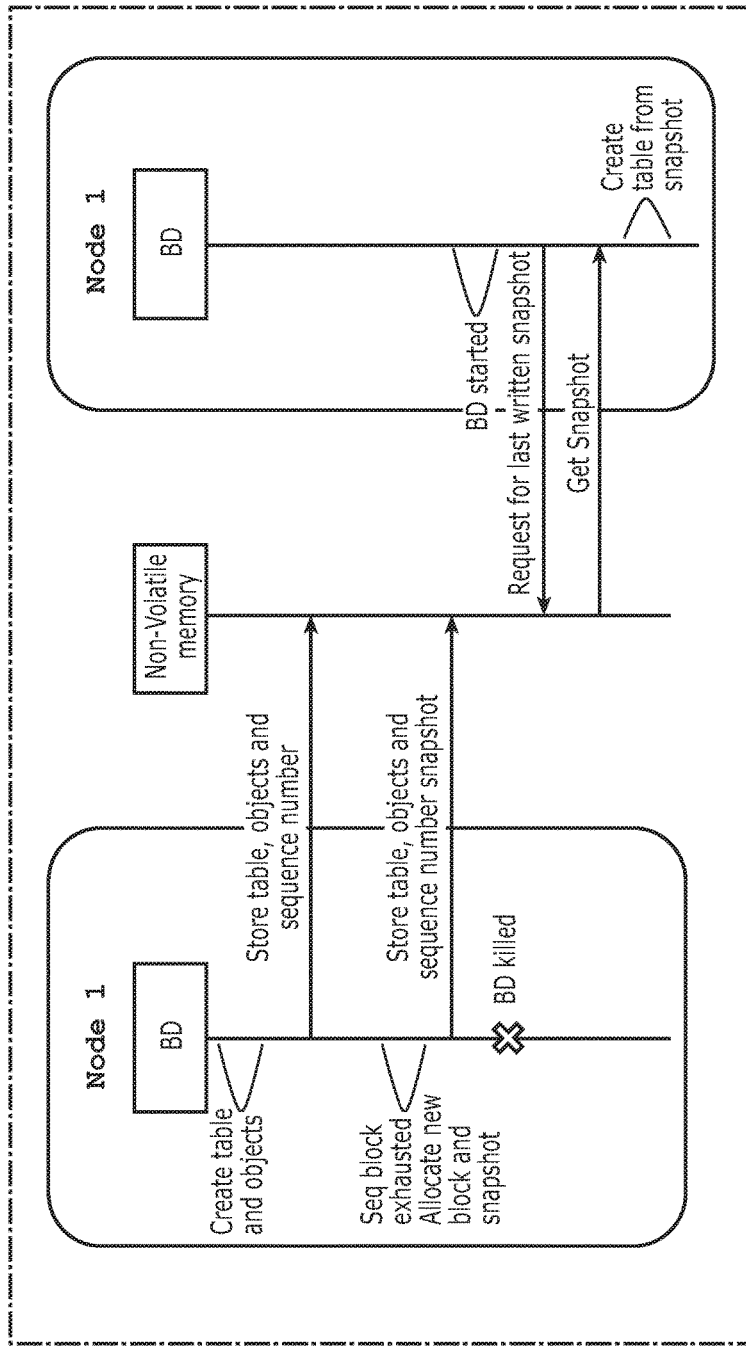
FIG. 18 depicts an exemplary embodiment, illustrating the snapshot function.

This feature is not enabled by default. If enabled, snapshot of the system is taken frequently. Snapshot of the system can be taken by issuing the "snapshot" command also. Every state is represented as an object. TCP/IP stack is also part of the infra. Each and every TCP/UDP block are viewed as objects. Snapshotting includes even dumping these TCP/UDP block into volatile memory and reincarnating those on new BD. This is also one of the way of achieving NSR. A sequence involving snapshotting is shown in FIG. 18.

BD Motion

One of the immediate advantage of snapshot feature is a Live BD migration. Live migration of a BD from one node to another is enabled in the three steps:

| Steps | Description |
|---|---|
| 1 | Momentarily stop BD. Dump all the Tables and objects of the BD to a non-volatile memory |
| 2 | Spawn a new BD in a different Node |
| 3 | Request for the snapshot of the BD. Read and populate the tables and start functioning from where the previous BD left |

Figure 19:
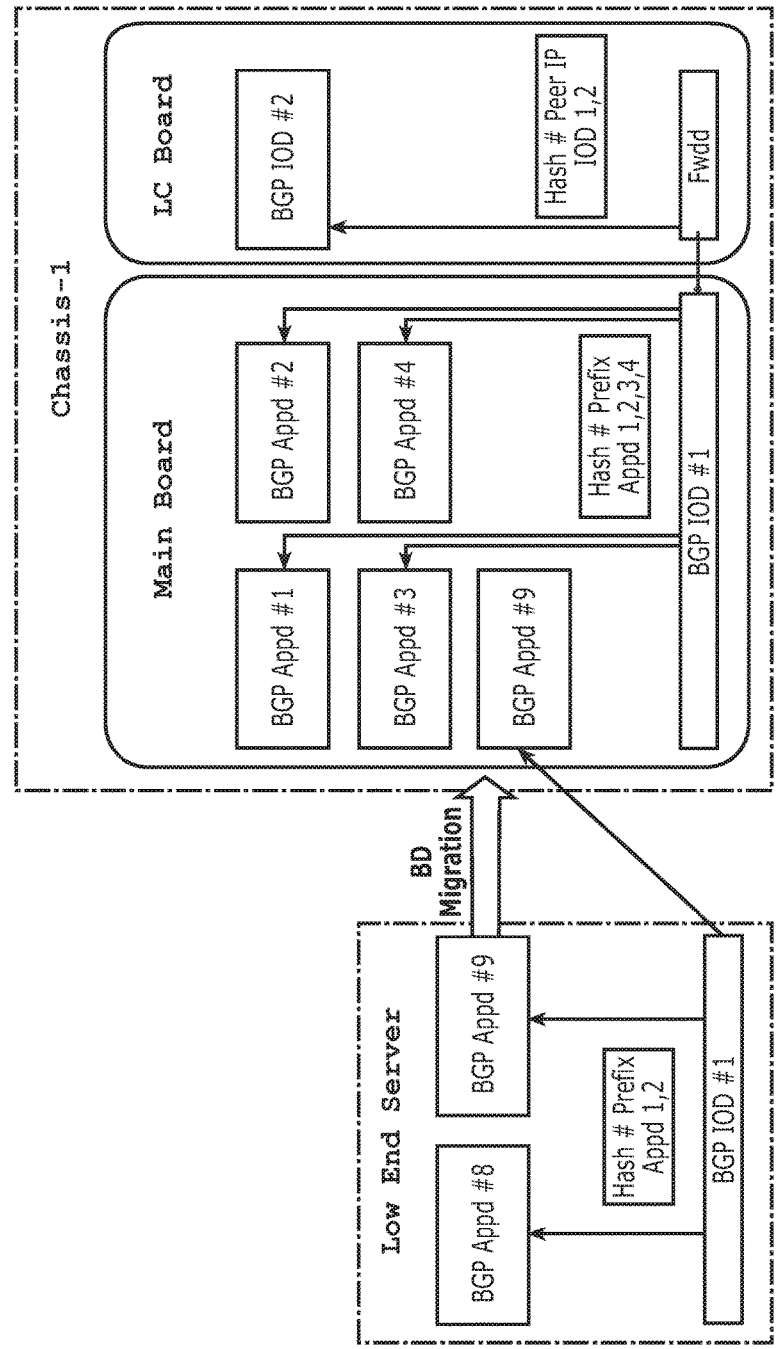
FIG. 19 depicts an exemplary embodiment, illustrating live BD migration.

FIG. 19 depicts the BD migration from a Low end server to high end Chassis. Here BGP Appd #9 is moved from Low end server to high end Chassis-1. Even though the BD is not located in Node 1, the object sharding based on Prefix is sent to BGP Appd #9.

Figure 20:
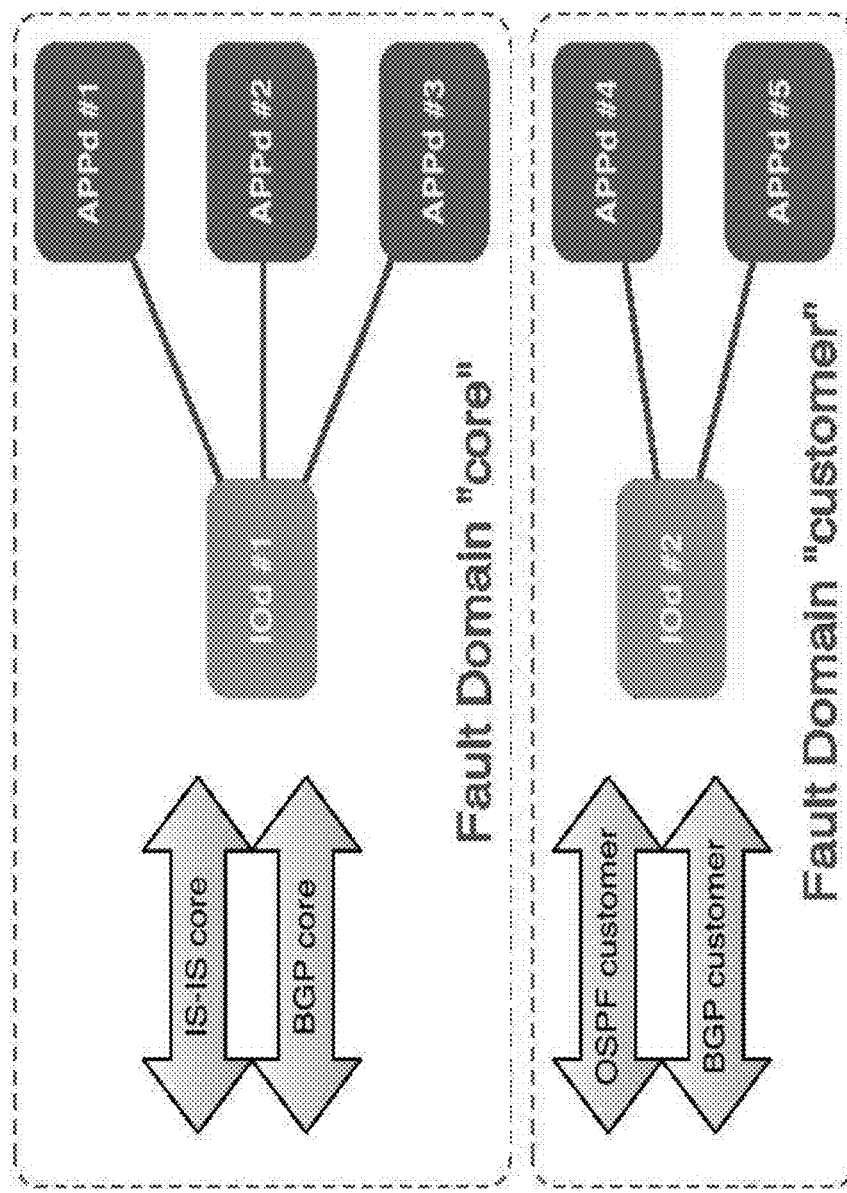
FIG. 20 depicts an exemplary embodiment of Fault Domains.

BD does not make any assumption of the locality in which it is running viz: low end servers to high end router. In case of processing capacity constraints BDs can be migrated from one node to another Performing hardware maintenance without any scheduled downtime Fault Domains If a BD reboots, it will be impacting only a small portion in the overall functionality. In this architecture set of BD's serving each customer can be segregated. This helps to restrict propagation of false routing. This concept as shown in FIG. 20 depicts a fault domain that enables localization of failure impact.

Vector Clock and Archival Server

To ensure temporal consistency in the system the micro-services based router can use the well-known concept of vector clock for interaction between components that derive their clock from different clock sources especially for off-board interactions. The vector clock schema allows for synchronization and causality of events in object table access and consistent processing allowing various different publishers of state publishers updating a table to get into synch during the course of operation.

In addition to the above the router can send object state generated by the routers with time stamps to an off-line server thereby allowing state to be persisted via frequent updates. This information allows for easy rewind and replay of events on the system at a given time shot to allow for triaging and debugging issues besides plotting information for both operational and strategic analysis.

Characteristics of System

System and method disclosed herein offer high availability. Any system can and will fail at some point. High availability can achieved by letting the system fail but fix it efficiently. The following table 4 summarizes features of a typical system and of the RtBrick system.

the format does not assume any locality of memory which allows seamless migration to processor cores that are located anywhere.

In some embodiments, in the current system, an active/active state does not require periodic sharing of information between applications on 2 cores rather the information snapshots can be taken periodically via configuration or a job and used to re-create state.

In some embodiments, information is organized in BDSF and applications use this as a building block. State re-creation latency is relatively low and allows close to seamless migration.

Computer System and Program Product

The method disclosed herein can be implemented as a computer system and/or a computer program product that comprises a computer program mechanism embedded in a

TABLE 4

Comparison of a Typical System with an RtBrick System

| High Availability in a Typical System | High Availability in a RtBrick |
|---|---|
| TCP/IP stack in, for example, Unix systems is in kernel space. High availability using native Unix stack entails saving kernel TCP/IP state machine in persistent store. On restoration persisted state machine and protocol negotiation allows recreation of TCP state. TCP splicing is non-trivial when TCP/IP stack is in the kernel making it harder to persist state | TCP/IP stack completely in user space, this allows complete state machine and associated data in persistent store. On restoration persisted state machine and TCP/IP data is restored to start the connection. User space TCP/IP stack allows end users greater control of Transport layer and makes it easy to enable capabilities like TCP splicing |
| Application information is distributed across user space and kernel which requires coordination of state between the spaces to restore state | All application state is completely encapsulated in user space, this allows complete state to be persisted using well known concepts like object and table persistence |
| Restoring state involves reading persistent state and then deriving information associated with it. This takes some interpretation and processing. | Restoring state is done by reading the persisted object and tables and generating the binary format Brick Data Store Format (BDSF). This is a uniform format in the system is used in IPC, in memory and on file |
| Application state is a view derived from the persisted state and requires processing and creation of data structures to generate the same. | In BDSF, the applications use the strong abstraction built into the infrastructure to rebuild state. This is stored in BDSF hence re-creation of state requires small amount of processing when the BDSF format is used. |
| Data restored from persistent store is used to create data structures which typically involves mapping the information into protocol specific data structures | All protocol specific data structures are built around BDSF our internal binary format. These data structures are provided as utilities around BDSF and highly optimized for performance and scale |
| Periodic exchange of information between the controllers to ensure active/active standby. State persistence assume locality of memory hence moving information to another processor core has additional persistence | Active/Active is possible in Rtbrick. Snapshots can be taken (via configuration or timer) to freeze state on one processor core and use the information to recreate state on another processor core since BDSF does not assume locality of reference. |

The system and method disclosed herein offer numerous advantages. For example, the user level TCP/IP stack allows all complete state machine and data to be persisted. In some embodiments, the current system allows TCP/IP state to be persisted and spliced on processor cores that are located on servers. Applications are in user space completely all the way to Layer 3 (e.g., the network layer) without retaining state in the kernel.

In some embodiments, objects are serialized from user space as objects and tables that can be understood by BDSF format. Objects can also be de-serialized on restoration from persistent store and restored to BDSF format/utilities.

In some embodiments, the current method and system allow easy migration of application objects is easier since computer readable storage medium. Further, any of the methods of the present invention can be implemented in one or more computers or computer systems. Further still, any of the methods of the present invention can be implemented in one or more computer program products. Some embodiments of the present invention provide a computer system or a computer program product that encodes or has instructions for performing any or all of the methods disclosed herein. Such methods/instructions can be stored on a CD-ROM, DVD, magnetic disk storage product, or any other computer readable data or program storage product. Such methods can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. Such methods encoded in the computer program product can also be distributed electronically, via the Internet or otherwise, by transmission of a computer data signal (in which the software modules are embedded) either digitally or on a carrier wave.

Some embodiments of the present invention provide a computer system or a computer program product that contains any or all of the program modules as disclosed herein. These program modules can be stored on a CD-ROM, DVD, magnetic disk storage product, or any other computer readable data or program storage product. The program modules can also be embedded in permanent storage, such as ROM, one or more programmable chips, or one or more application specific integrated circuits (ASICs). Such permanent storage can be localized in a server, 802.11 access point, 802.11 wireless bridge/station, repeater, router, mobile phone, or other electronic devices. The software modules in the computer program product can also be distributed electronically, via the Internet or otherwise, by transmission of a computer data signal (in which the software modules are embedded) either digitally or on a carrier wave.

Having described the invention in detail, it will be apparent that modifications, variations, and equivalent embodiments are possible without departing the scope of the invention defined in the appended claims. Furthermore, it should be appreciated that all examples in the present disclosure are provided as non-limiting examples.

EXAMPLES

The following non-limiting examples are provided to further illustrate embodiments of the invention disclosed herein. It should be appreciated by those of skill in the art that the techniques disclosed in the examples that follow represent approaches that have been found to function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Scaling Number

The scaling number mentioned below are the expected scale numbers of the system based on this architecture.

Scaling Number Table

| Sl. No. | Description | Numbers |
| --- | --- | --- |
| 1 | Number of Logical interfaces | 100K |
| 2 | Number of Ipv4 Prefixes | 10 Million |
| 3 | Number of Ipv6 Prefixes | 10 Million |
| 4 | Number of BGP Neighbors | 50K |
| 5 | Number of BGP Rib-in Route | 10 Million |
| 6 | Number of BGP Rib-out Route | 10 Million |
| 7 | Number of BGP Local-Rib | 10 Million |

The following table illustrates the recovery efficiency under the system as disclosed herein.

Convergence Numbers

| | Description | Actual performance |
| --- | --- | --- |
| Software Failure | A controlled soft fail over is essential for any In-Service Software Upgrade (ISSU). In a typical scenarios ISSU requires the entire software to restart after building state from persistence store, where the information is retained before a controlled restart. In this system however sharding distributes the load across multiple BDs and ISSU event thus impacts only a subset of routes or a slice of the total unit. Furthermore the micro-services architectures allows the restarted BD to co-exist with other Bds. | Time taken to get back to healthy state is ~3 Seconds in this architecture for 1 million objects which is 10 ns per object. This is an order of magnitude improvement for high availability on systems that the authors are aware of |
| Multipath Failure | BGP prefixes are sharded across multiple applications units.. If an event triggers a link or a neighbor to flap then the load of recomputing prefix will be inversely proportional to the application units in the system. This increases the resilience of the system in face of failures. | In this system the recovery from such failure cases are expected to be in order of nanoseconds. |

The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as may be taught or suggested herein. A variety of advantageous and disadvantageous alternatives are mentioned herein. It is to be understood that some preferred embodiments specifically include one, another, or several advantageous features, while others specifically exclude one, another, or several disadvantageous features, while still others specifically mitigate a present disadvantageous feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be mixed and matched by one of ordinary skill in this art to perform methods in accordance with principles described herein. Among the various elements, features, and steps some will be specifically included and others specifically excluded in diverse embodiments.

Although the invention has been disclosed in the context of certain embodiments and examples, it will be understood by those skilled in the art that the embodiments of the invention extend beyond the specifically disclosed embodiments to other alternative embodiments and/or uses and modifications and equivalents thereof.

Many variations and alternative elements have been disclosed in embodiments of the present invention. Still further variations and alternate elements will be apparent to one of skill in the art.

In some embodiments, the numbers expressing quantities of ingredients, properties such as molecular weight, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

What is claimed is:

1. A distributed, modular and highly available network routing apparatus that is enabled to perform IP, MPLS VPN v4 and v6 services, the network routing apparatus comprising:
   a plurality of functional modules selected from the group consisting of a processor, a data storage module, an input/output module, a shared memory, and a network module;
   wherein the network routing apparatus is run by an operating system comprising a system space and a user space,
   wherein each functional module in the plurality functions modules is driven by a micro-services based software architecture comprising one selected from the group consisting of a TCP/IP stack, a protocol serializer, a protocol de-serializer, an in-memory data store, and one or more utility applications,
   wherein the software architecture is at least partially retained in the user space of the operating system of the network routing apparatus,
   wherein the in-memory data store comprises one selected from the group consisting of one or more state of the network routing apparatus, one or more state of the software architecture, and one or more state of the software architecture and network routing apparatus, and
   wherein each of the one or more state comprises an in memory representation of all data organized in tables in a common binary format: the brick data store format (BDSF), accessible to each of the one or more utility applications which provide control plane and domain specific functionality on the platform.

2. The network routing apparatus of claim 1, wherein a protocol serializer or de-serializer serializes information from BDSF objects to on the wire format and de-serializer on the wire format to BDSF objects.

3. The network routing apparatus of claim 1, wherein sharding of the software architecture is based on one selected from the group consisting of i) a set of neighbors of the routing apparatus within a network to create shard per neighbor, ii) prefixes learnt from the network, iii) a set of neighbors of the routing apparatus within a network to create shard per neighbor and prefixes learnt from the network, iv) range, v) hash, vi) lookup based on number of processors, and combinations thereof.

4. The network routing apparatus of claim 1, wherein the software architecture comprises a JSON configuration file that allows plug-n-play of features.

5. A computer program product comprising a non-transitory computer-readable medium having computer program logic recorded thereon arranged to put into effect the software architecture of claim 1.

6. A distributed, modular and highly available network routing apparatus that is enabled to perform IP, MPLS VPN v4 and v6 services, the network routing apparatus comprising:
   a plurality of functional modules selected from the group consisting of a processor, a data storage module, an input/output module, a shared memory, and a network module;
   wherein the network routing apparatus is run by an operating system comprising a system space and a user space,
   wherein each functional module in the plurality functions modules is driven by a micro-services based software architecture comprising one selected from the group consisting of a TCP/IP stack, a protocol serializer, a protocol de-serializer, an in-memory data store, and one or more utility applications,
   wherein the software architecture is at least partially retained in the user space of the operating system of the network routing apparatus,
   wherein the one or more utility applications comprise an input/output daemon (IOd), a forwarding daemon (FWDd), an application daemon (APPd), or combinations thereof, and
   wherein the software architecture allows an Anti-Fragile Restart (AFR), which comprises an instant re-start of an APPd based on a disk snapshot of a previous incarnation of a system state thereby allowing seamless restart from the previous incarnation.

7. A distributed, modular and highly available network routing apparatus that is enabled to perform IP, MPLS VPN v4 and v6 services, the network routing apparatus comprising:
   a plurality of functional modules selected from the group consisting of a processor, a data storage module, an input/output module, a shared memory, and a network module;
   wherein the network routing apparatus is run by an operating system comprising a system space and a user space,
   wherein each functional module in the plurality functions modules is driven by a micro-services based software architecture comprising one selected from the group consisting of a TCP/IP stack, a protocol serializer, a protocol de-serializer, an in-memory data store, and one or more utility applications, wherein the software architecture is at least partially retained in the user space of the operating system of the network routing apparatus, and wherein the one or more utility applications allow division and separation of information in the form of prefixes and BGP address families, thereby allowing BGP protocol in the routing control plane to scale by diving processing in smaller atomic units.

8. The network routing apparatus of claim 7, wherein the one or more utility applications allow an Anti-Fragile Restart (AFR) along with localization assumption, thereby allowing state associated with the one or more utility applications to migrate from a first node to a second node (e.g., VMs or chassis within a router or between routers).

9. A distributed, modular and highly available network routing apparatus that is enabled to perform IP, MPLS VPN v4 and v6 services, the network routing apparatus comprising:

a plurality of functional modules selected from the group consisting of a processor, a data storage module, an input/output module, a shared memory, and a network module;

wherein the network routing apparatus is run by an operating system comprising a system space and a user space, wherein each functional module in the plurality functions modules is driven by a micro-services based software architecture comprising one selected from the group consisting of a TCP/IP stack, a protocol serializer, a protocol de-serializer, an in-memory data store, and one or more utility applications, wherein the software architecture is at least partially retained in the user space of the operating system of the network routing apparatus, and wherein a planned restart is based on a stored state of the one or more utility applications, wherein the stored state is retained by dumping all tables of each of the one or more utility applications to a non-volatile memory.

10. The network routing apparatus of claim 9, wherein the stored state of the one or more utility applications can be accessed by a different processor, and wherein the different processor re-populates tables using the stored state of the one or more utility applications.

11. A distributed, modular and highly available network routing apparatus that is enabled to perform IP, MPLS VPN v4 and v6 services, the network routing apparatus comprising:

a plurality of functional modules selected from the group consisting of a processor, a data storage module, an input/output module, a shared memory, and a network module;

wherein the network routing apparatus is run by an operating system comprising a system space and a user space, wherein each functional module in the plurality functions modules is driven by a micro-services based software architecture comprising one selected from the group consisting of a TCP/IP stack, a protocol serializer, a protocol de-serializer, an in-memory data store, and one or more utility applications, wherein the software architecture is at least partially retained in the user space of the operating system of the network routing apparatus, and wherein an unplanned restart is based on a state of the one or more utility applications that has persisted in a non-volatile memory of the network routing apparatus and sequence numbers using a distributed block management to ensure no roll-over of these values to allowing collision free restart and perform recovery post restart.

12. A distributed, modular and highly available network routing apparatus that is enabled to perform IP, MPLS VPN v4 and v6 services, the network routing apparatus comprising:

a plurality of functional modules selected from the group consisting of a processor, a data storage module, an input/output module, a shared memory, and a network module;

wherein the network routing apparatus is run by an operating system comprising a system space and a user space, wherein each functional module in the plurality functions modules is driven by a micro-services based software architecture comprising one selected from the group consisting of a TCP/IP stack, a protocol serializer, a protocol de-serializer, an in-memory data store, and one or more utility applications, wherein the software architecture is at least partially retained in the user space of the operating system of the network routing apparatus, and wherein the one or more utility applications allow manipulation of object attributes without assumption on the locality of reference, thereby allowing each of one or more utility applications to create tables, add objects and subscribe for remote updates without concern for locality of the tables.

13. A distributed, modular and highly available network routing apparatus that is enabled to perform IP, MPLS VPN v4 and v6 services, the network routing apparatus comprising:

a plurality of functional modules selected from the group consisting of a processor, a data storage module, an input/output module, a shared memory, and a network module;

wherein the network routing apparatus is run by an operating system comprising a system space and a user space, wherein each functional module in the plurality functions modules is driven by a micro-services based software architecture comprising one selected from the group consisting of a TCP/IP stack, a protocol serializer, a protocol de-serializer, an in-memory data store, and one or more utility applications, wherein the software architecture is at least partially retained in the user space of the operating system of the network routing apparatus, and wherein the one or more utility applications allow a recursive architecture where an instance of routing protocol (e.g., IS-IS) used for discovering nodes in a network is also used for discovery of service endpoints and state synchronization.

14. A method of providing microservices-based network services in a network comprising a plurality of interconnected network routing apparatus, wherein each network routing apparatus comprises a plurality of functional modules selected from the group consisting of a processor, a data storage module, an input/output module, a shared memory, and a network module; wherein each network routing apparatus is run by an operating system comprising a system space and a user space, wherein the network services are driven by a software architecture comprising a TCP/IP stack, a publish-subscribe bus, a protocol serializer, a protocol de-serializer, an in-memory data store and one or more utility applications, and the method comprising the steps of:

initializing each network routing apparatus, creating, via one or more forwarding utility applications in the one or more utility applications, one or more tables for forwarding information from an incoming control packet to one or more input/output utility applications in the one or more utility applications, thereby sharding the information from the incoming control packet based on one or more neighboring network routing apparatus; and creating, via each of the one or more input/output utility applications, one or more new tables for forwarding information from the incoming control packet to one or more route computation utility applications in the one or more utility applications, thereby further sharding the information from the incoming control packet.

15. The method of claim 14, wherein the step of initializing each network routing apparatus comprises:

reading configuration stored in JSON format from the data storage module; and instantiating the one or more utility applications to re-creating run time state saved in a binary format (BDSF) from tables in the data storage module.

16. The method of claim 14, wherein the sharding is based on a mechanism selected from the group consisting of range, prefixes learned from the network, a hash function, and lookup based on number of processors, mapped to internet protocols corresponding to one or more neighboring network routing apparatus and further sharding is based on the prefixes learned from the network are spread across different route computation utility applications learned from one or more neighboring network routing apparatus.

17. The method of claim 16, further comprising:

computing, via one or more route computation utility applications, the best route for downloading a specific prefix, thereby generating a publish-subscribe update that is processed by one or more the forwarding utility applications.

* * * * *